(12) United States Patent
Okubo

(10) Patent No.: US 8,160,435 B2
(45) Date of Patent: Apr. 17, 2012

(54) FLASH UNIT, CAMERA, AND CAMERA FLASH SYSTEM

(75) Inventor: Mitsumasa Okubo, Hino (JP)

(73) Assignee: Olympus Imaging Corp., Tokyo (JP)

( * ) Notice: Subject to any disclaimer, the term of this patent is extended or adjusted under 35 U.S.C. 154(b) by 592 days.

(21) Appl. No.: 12/365,942

(22) Filed: Feb. 5, 2009

(65) Prior Publication Data

US 2009/0196595 A1 Aug. 6, 2009

(30) Foreign Application Priority Data

Feb. 6, 2008 (JP) ................. 2008-025952

(51) Int. Cl.
*G03B 15/03* (2006.01)
(52) U.S. Cl. ............... 396/56; 396/175; 396/201
(58) Field of Classification Search ............ 396/56, 396/57, 62, 157, 159, 175, 201, 204, 287, 396/374
See application file for complete search history.

(56) References Cited

U.S. PATENT DOCUMENTS

| | | | | |
|---|---|---|---|---|
| 6,507,711 B2 * | 1/2003 | Maruyama | | 396/374 |
| 7,509,043 B2 * | 3/2009 | Matsui et al. | | 396/164 |
| 7,636,518 B2 * | 12/2009 | Tanaka et al. | | 396/56 |
| 2007/0019943 A1 * | 1/2007 | Sueyoshi et al. | | 396/287 |
| 2008/0231742 A1 * | 9/2008 | Kurase | | 348/333.01 |

FOREIGN PATENT DOCUMENTS

JP 2000-089305 3/2000

* cited by examiner

*Primary Examiner* — W. B. Perkey
(74) *Attorney, Agent, or Firm* — John C. Pokotylo; Straub & Pokotylo

(57) ABSTRACT

A flash unit of the present invention is capable of being used as a supplementary light source for taking photographs, and comprises a light emitting section capable of changing an illumination area of a flash, an imaging section capable of imaging a picture, including a subject of the illumination area, a display section capable of displaying setting values for the flash unit, or the illumination area, and a display control section for causing display of the illumination area on the display section.

17 Claims, 25 Drawing Sheets

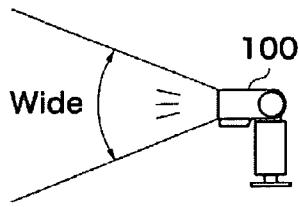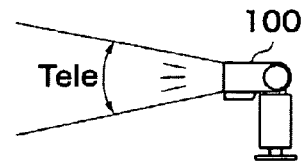
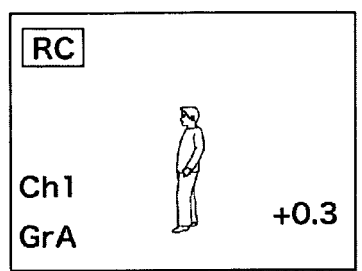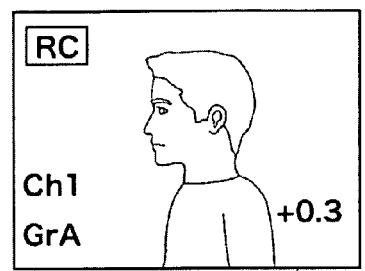
FIG. 7A    FIG. 7B
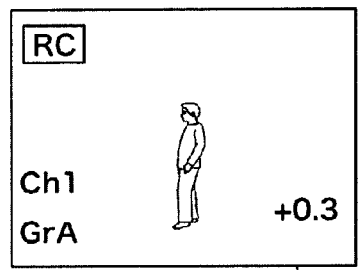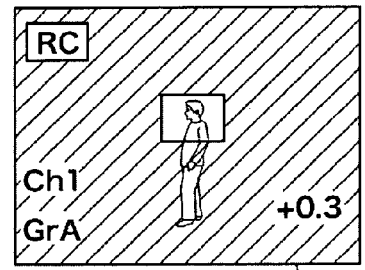
FIG. 7C    FIG. 7D
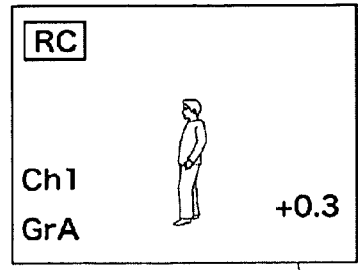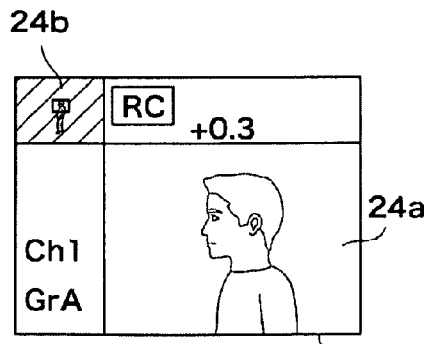
FIG. 7E    FIG. 7F

FIG. 9

| attached to camera 1 | auto zoom | front of light emitting unit 12 | illumination area image display |
|---|---|---|---|
| ○ | ○ | ○ | No |
| ○ | ○ | × | Yes |
| ○ | × | ○ | Yes |
| × | — | — | Yes |

FIG. 24

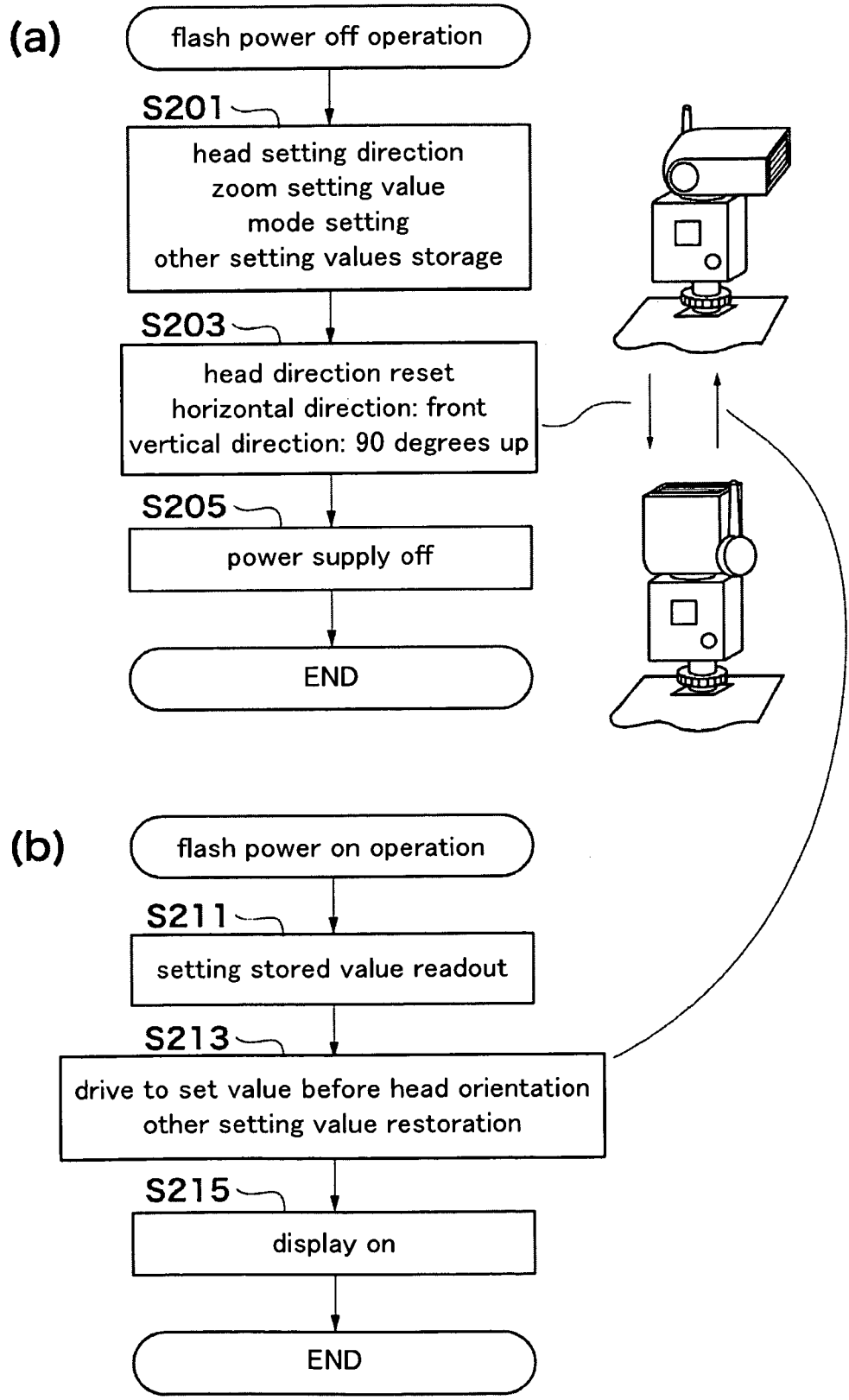

(a)
- flash power off operation
- S201: head setting direction / zoom setting value / mode setting / other setting values storage
- S203: head direction reset / horizontal direction: front / vertical direction: 90 degrees up
- S205: power supply off
- END (b)
- flash power on operation
- S211: setting stored value readout
- S213: drive to set value before head orientation / other setting value restoration
- S215: display on
- END

FIG. 25
(a)
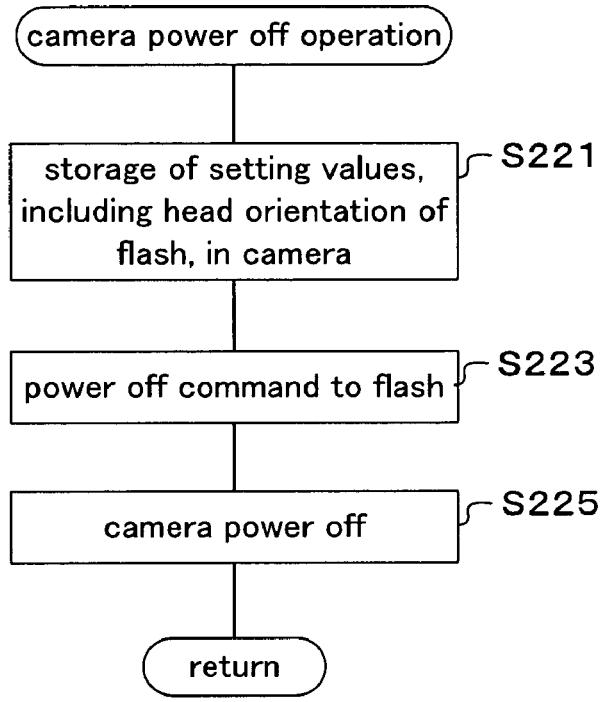
(b)
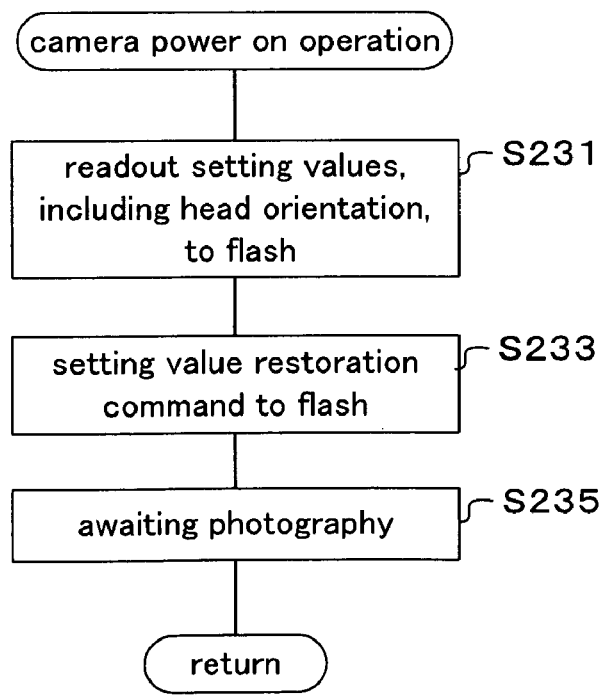

FLASH UNIT, CAMERA, AND CAMERA FLASH SYSTEM

Benefit is claimed, under 35 U.S.C. §119, to the filing date of prior Japanese Patent Application No. 2008-25952 filed on Feb. 6, 2008. This application is expressly incorporated herein by reference. The scope of the present invention is not limited to any requirements of the specific embodiments described in the application.

BACKGROUND OF THE INVENTION

1. Field of the Invention

The present invention relates to a flash unit, a camera, and a camera flash system, and in detail relates to a flash unit that can be used as a supplementary lighting device for a camera such as an imaging device, and that is capable of being used while being attached to a camera or when detached from the camera, to a camera capable of operating in cooperation with this flash unit, and to a camera flash system comprising this flash unit and camera.

2. Description of the Related Art

When taking photographs using supplementary light of a flash unit, it is necessary to take into consideration the area illuminated by the flash unit when taking photographs. In particular, in the case where the flash unit is arranged at a positioned apart from the camera, illumination conditions of a subject vary depending on the position of the flash unit and the direction of a light emitting section, and so the setting of the flash unit is important when taking photographs. There have therefore been various proposals for strobe systems that are capable of confirming the illumination conditions achieved by the flash unit before taking a picture.

For example, Japanese publication of unexamined application No. 2000-89305 (Laid-open Mar. 31, 2000) discloses a strobe system that also emits preflashes from a slave strobe in response to flash emission from a master strobe, and controls flash intensity of the master strobe and the slave strobe from a ratio between amount of reflected light at the time of preflash and a set flash intensity. Specifically, in this prior art it is possible to confirm lighting achieved by a flash unit that has been is arranged away from the camera using modeling flash.

SUMMARY OF THE INVENTION

The present invention has as an object to provide a flash unit that can confirm, accurately and in real time, an illumination area of a flash unit that has been arranged apart from a camera, a camera, and a camera flash system.

According to a first invention, there is provided a flash unit, capable of being used as a supplementary light source for taking photographs, comprising: a light emitting section capable of changing an illumination area of a flash; an imaging section capable of forming an image, including a subject of the illumination area; a display section capable of displaying setting values for the flash unit, or the illumination area; and a display control section for causing display of the illumination area on the display section.

Also, according to a second invention, there is provided a flash unit, capable of being used as a supplementary light source for taking photographs, comprising: an imaging section capable of imaging a subject of a flash illumination area; a display section capable of displaying setting values for the flash unit, or the illumination area; a detection section for detecting whether the flash unit is permanently connected to a camera for taking photographs or is detached from the camera, such that a photographed image range and an illumination area are substantially the same; and a switching section for switching content to be displayed on the display section based on output from the detection section.

Further, according to a third invention, there is provided a flash unit, capable of being used as a supplementary light source for taking photographs, comprising: a light emitting section for irradiating flash light towards a subject; an imaging section capable of forming an image, including a subject of an illumination area of the light emitting section; and a transmission section for transmitting an image formed by the imaging section to a camera.

Still further, according to a fourth invention there is provided a camera, comprising: a camera side transmission section for outputting control signals to a flash unit that is detached from a camera body; a camera side receiving section for receiving an imaged picture of an illumination area from the flash unit; and a display section for displaying an imaged picture of the illumination area.

There is further provided, according to a fifth invention, a camera flash system, made up of a camera, and a flash unit that is capable of being detached from the camera, and is capable of being used as a supplementary light source for taking pictures, comprising: light emitting section for irradiating flash light towards a subject; an imaging section capable of forming an image, including a subject of an illumination area irradiated by the light emitting section; a flash side transmission section for transmitting a image formed by the imaging section to the camera; a camera side transmission section for outputting control signals from the camera side to the flash unit; a camera side receiving section for receiving a formed image of the illumination area from the flash unit; and a camera side display section for displaying the illumination area.

Further, according to a sixth invention, there is provided a flash unit, capable of being used as a supplementary light source for taking photographs, comprising: a light emitting section capable of changing an illumination area; an imaging section capable of imaging a range that is sufficiently larger than the illumination area; and an irradiation range image output section for determining a range that is illuminated by the light emitting section, based on an image acquired using pre-flash of the light emitting section, and outputting the image of the irradiation range.

BRIEF DESCRIPTION OF THE DRAWINGS

FIG. 7A to FIG. 7F are drawings showing display methods for an illumination range of the flash unit of the first embodiment of the present invention, with FIGS. 7A and 7B being a display method of style 1, FIGS. 7C and 7D being a display method of style 2, and FIGS. 7E and 7F being a display method of style 3.

FIG. 9 is a drawing showing relationships for whether or not to perform image display of an illumination area on the rear display LCD in the flash unit, in a camera flash system of the first embodiment of the present invention.

FIG. 24 is a flowchart showing operation at the time of turning power of a flash unit of the second embodiment of the present invention on or off, with (a) showing operation when power is turned off, and (b) showing operation when power is turned on.

FIG. 25 is a flowchart showing operation at the time of turning power to a camera of the second embodiment of the present invention on or off, with (a) showing operation when power is turned off, and (b) showing operation when power is turned on.

DETAILED DESCRIPTION OF THE PREFERRED EMBODIMENTS

Figure 1:
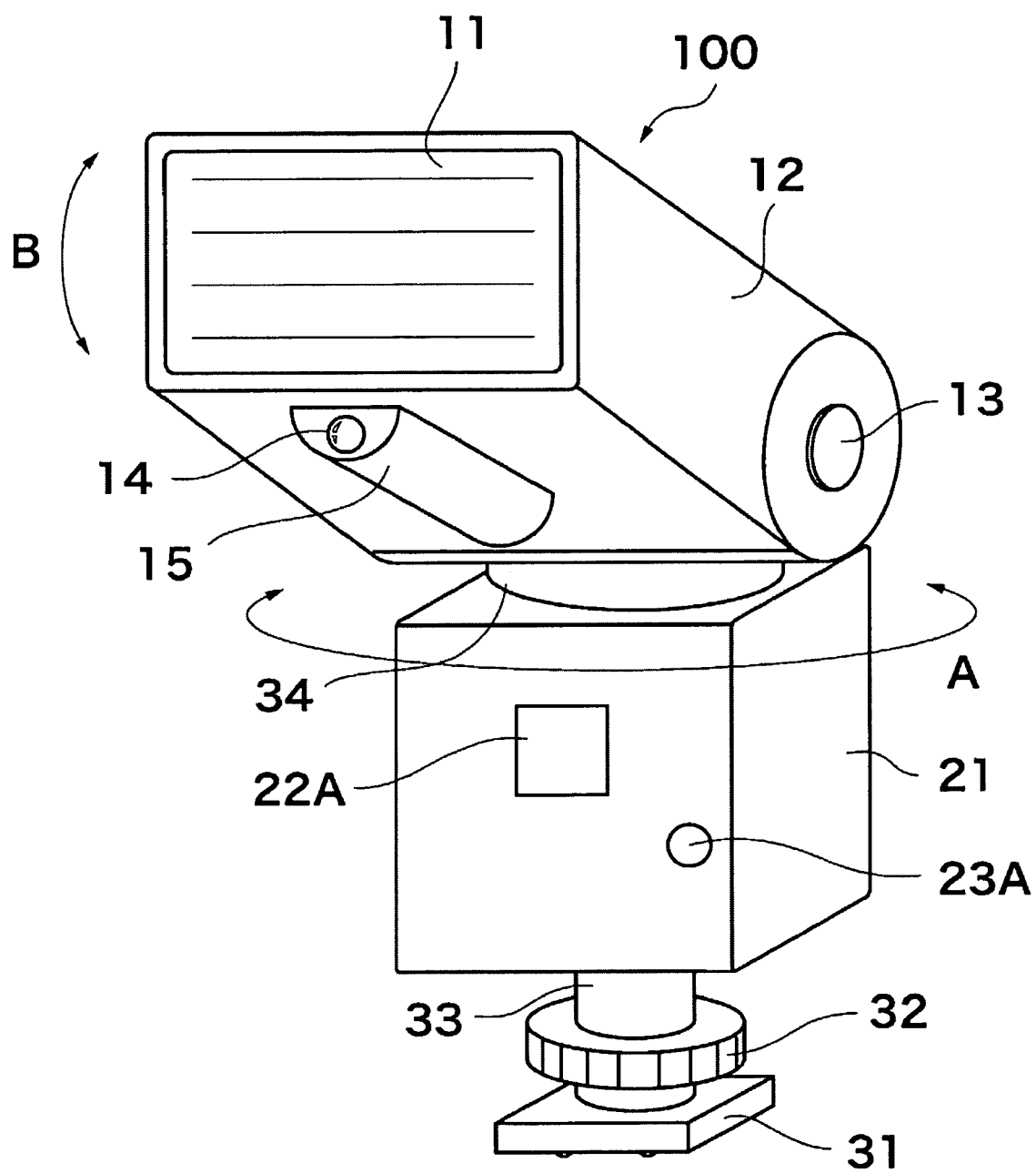
FIG. 1 is an external perspective drawing looking at a flash unit of a first embodiment of the present invention from the front.
Figure 2:
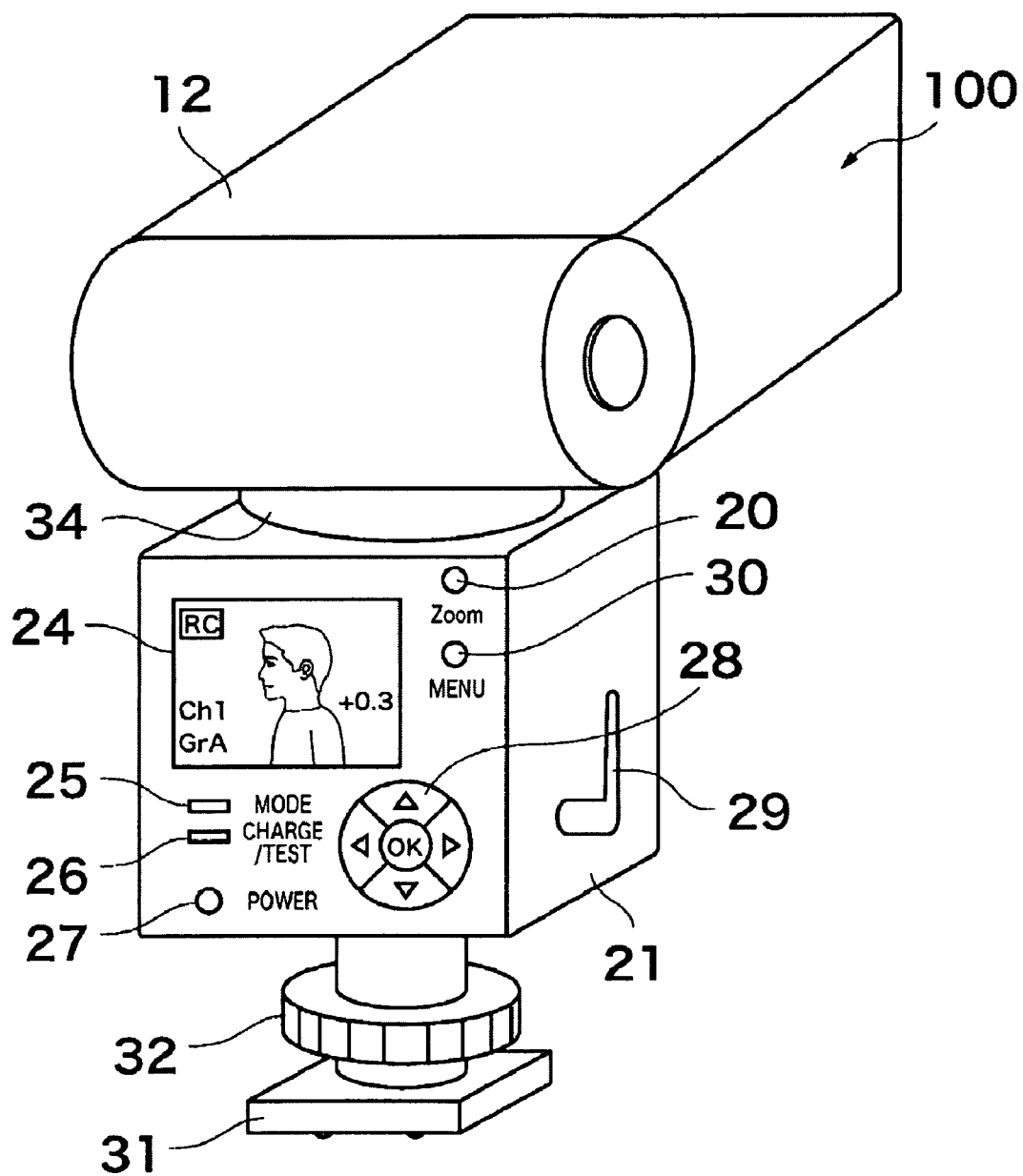
FIG. 2 is an external perspective drawing looking at the flash unit of a first embodiment of the present invention from the rear.

In the following, a preferred first embodiment using a camera flash system made up of a camera 1 and a flash unit 100, adopting the present invention, will be described using the drawings. FIG. 1 is an external perspective view of a flash unit 100 of a first embodiment of the present invention, looking from the front, and FIG. 2 is an external perspective view of the flash unit 100 looking from the rear.

A control circuit etc. for controlling the entire flash unit 100 is provided inside a flash control section body 21. An AF-assist light window 22A and a slave sensor window 23A are provided on a front surface of the flash control section body 21. The AF assist light window 22A includes a flood light lens for assist light projection for assisting in auto focus of the camera by illuminating a subject when the subject is dark.

The slave sensor window 23A includes a light receiving lens for receiving signal light from a commander flash. Specifically, in the case where the flash unit 100 operates as a wireless flash, signal light from a command flash, such as a built-in flash of the camera provided with a commander function, passes through the slave sensor window 23A and is received, and this flash unit 100 performs slave flash in accordance with signal light received from the commander flash.

A stem 33 is fixed to a bottom part of the flash control section body 21, and a hot shoe 31 is provided on an end part of this stem 33. A signal terminal 31a (refer to FIG. 3) for carrying out wired communication with the camera 1 is provided on a lower part of the hot shoe 31. A shoe lock nut 32 is a locking member for locking with the camera 1 when fitting the hot shoe 31 to the hot shoe 63 of the camera 1 (refer to FIG. 4), and is threaded on to the stem 33.

A shaft section 34 is provided on an upper part of the flash control section body 21, and a light emitting unit 12 is pivotally supported on this shaft section 34. The light emitting unit 12 is freely rotatable around the shaft section 34 (in the direction of the arrow A), and is rotatable about an axis passing through a bounce release button 13 (in the direction of arrow B). If the bounce release button 13 is pressed to release its fixed state, the light emitting unit 12 can be rotated up and down, and to the left and right.

A flash emitting section 11 is arranged on the front of the light emitting unit 12, this flash emitting section 11 includes a Fresnel lens 11a (refer to FIG. 3), and as will be described later has a Xenon tube 101 arranged inside (refer to FIG. 3), with flash light being irradiated by passing through the Fresnel lens 11a of the flash emitting section 11.

An imaging unit 15 is fixed to a bottom part of the light emitting unit 12, and an imaging lens 14 is arranged at a front side of this imaging unit 15. Since the imaging unit 15 is integrally constructed with the light emission unit 12, the imaging direction of the imaging unit 15 is always coincident with the direction of irradiation of flash light by the light emitting unit 12. Accordingly, it is possible to acquire an image of the irradiation direction of the light emission unit using the imaging unit 15.

As shown in FIG. 2, a zoom button 20, rear display LCD (Liquid Crystal Display) 24, mode button 25, charge/test button 26, power button 27, cross-shaped button 28, and menu button 30 are arranged on the rear of the flash control section body 21. The rear LCD 24 displays images acquired by the imaging unit 15, and other photographic information, and is a high-resolution display monitor constructed using STN (Super-Twisted Nematic Display) liquid crystals or TFTs (Thin Film Transistors).

The mode button 25 is a button for setting various modes for light emission control of the flash unit 100, such as TTL auto mode, auto mode, manual mode, RC mode (wireless remote control mode) for example. The charge/test button 26 lights up if the flash unit 100 has completed charging, and if it is pressed will carry out a test firing of the flash unit 100. The power button 27 is for turning on power to the flash unit 100.

The cross-shaped button 28 is made up of direction keys respectively provided for the four directions of up, down, left and right, and an OK button provided in the center of these direction keys. By respectively operating the four direction keys, it is possible to move a cursor displayed on the rear display LCD 24, and to confirm a selected item by operating the OK button.

The menu button 30 is an operating member for menu mode setting, and if the menu button 30 is operated a menu screen is displayed on the rear display LCD 24, and by then operating the cross-shaped button 28 in this state it is possible to perform desired setting etc. The zoom button 20 is an operation member for causing zooming of the flash light from the light emission unit 12. This zooming will be described later, but is carried out by varying the distance between the Fresnel lens 11a and Xenon tube 101 of the flash emitting section 11. Every time the zoom button 20 is pressed, the flash light is zoomed in by one step, and once the telephoto end is passed it returns to the wide-angle end.

A wireless radio communication antenna 29 is provided on the side of the flash control section body 21. As will be described later, with this embodiment transmission of image data etc. from the flash unit 100 to the camera 1 is carried out by wireless communication, and data is transmitted via the antenna 29 to the camera 1.

Figure 3A:
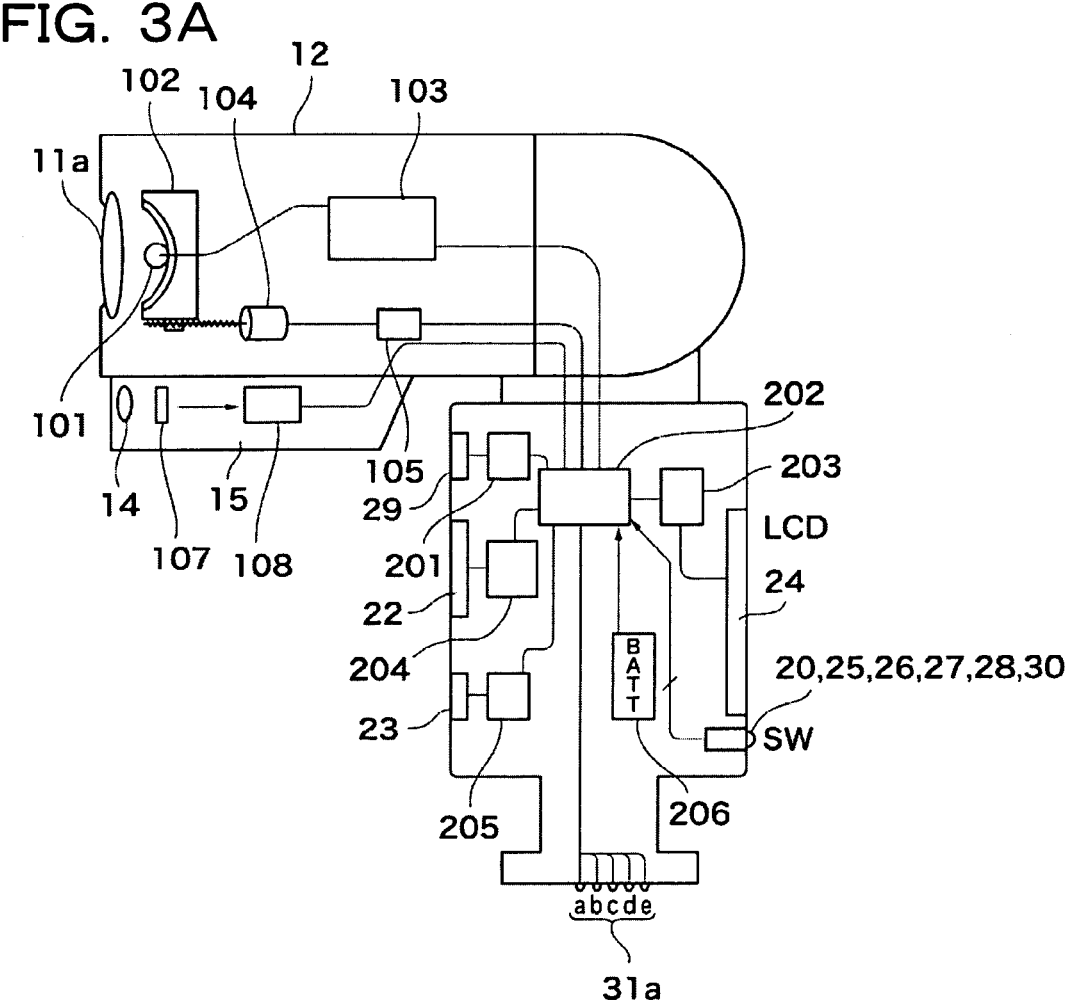
FIG. 3A to FIG. 3C are drawings showing electrical systems of the flash unit of the first embodiment of the present invention, with FIG. 3A being a block diagram showing electrical systems of the flash unit, FIG. 3B being a cross sectional drawing showing a hot shoe of a camera, and FIG. 3C showing a case where a flash unit 100 and a camera 1 connected by an off-flash cable 80.

Next, electrical systems of the flash unit 100 of this embodiment of the present invention will be described using the block diagram shown in FIG. 3. A Xenon tube 101 held in a reflector unit 101 is arranged inside the light emitting unit 12, behind a Fresnel lens 11a constituting a flash light emitting section 11. A charging/emission circuit 103 is connected to this Xenon tube 101, and it is possible to apply a high voltage, that is the power supply voltage of a battery that has been stepped up, to the Xenon tube 101. The charging/emission circuit 103 is connected to an arithmetic and control circuit 202 arranged inside the flash control section body 21, and the charging/emission circuit 103 is operated by commands of the arithmetic and control circuit 202.

A gear provided in the reflector unit 102 meshes with a gear provided on a drive shaft of a motor 104. The motor 104 is made up of a stepping motor, for example, and is connected to a motor driver 105, with this motor driver being connected to the arithmetic and control circuit 202. For this reason, if the motor 102 is driven forwards or backwards by commands from the arithmetic and control circuit 202, the xenon tube 101 held in the reflector unit 102 is either brought close to or moved away from the Fresnel lens, and as a result the irradiation angle is varied, to carry out a zooming operation.

An imaging lens 14 is arranged at a tip end of the imaging unit 15, and acquires an image corresponding to the irradiation angle of the flash unit 100. An image sensor 107 is arranged close to an image plane of the imaging lens 14, with a two-dimensional image sensor such as CCD (Charge coupled devices) or CMOS (Complementary Metal Oxide Silicon) being used as the image sensor 107.

Output of the image sensor 107 is connected to an image processing circuit 108, and output of this image processing circuit 108 is connected to the arithmetic and control circuit 202. Image signals read out from the image sensor 107 are processed by the image processing circuit 108, and sent to the arithmetic and control circuit 202.

The antenna 29 for wireless radio communication is connected to a radio transceiver circuit 201, and this radio transceiver circuit 201 is connected to the arithmetic and control circuit 202. Various data transmitted to the camera is sent wirelessly, via the antenna 29, from the radio transceiver circuit 201 in accordance with control by the arithmetic and control circuit 202.

An AF assist light section 22 for irradiating AF assist light by means of the AF assist light window 22A is arranged on the front of the flash control section body 21, the AF assist light section 22 is connected to the AF assist light drive control circuit 204, and the AF assist light drive control circuit 204 is connected to the arithmetic and control section 202. The AF assist light drive control circuit 204 receives control signals from the arithmetic and control circuit 202, and controls irradiation of the AF assist light.

A slave sensor 23 for receiving signal light from a commander flash by means of the slave sensor window 23A is also arranged in the front of the flash control section body 21, with this slave sensor 23 being connected to a slave signal processing circuit 205, and the slave signal processing circuit being connected to the arithmetic and control circuit. The slave sensor 23 receives signal light from a commander flash such as a built-in flash 64 of the camera body 1, or a flash unit 100 attached to the camera body 1, the slave signal processing circuit 205 processes signals based on received light, and the arithmetic and control circuit 202 performs control of the charging/emission control circuit 103 to fire the flash.

A rear display LCD 24 is connected to an LCD driver 203, and the LCD driver 203 is connected to the arithmetic and control circuit 202. The arithmetic and control circuit 202 displays information acquired by the image sensor 107, information of the flash unit 100 itself, or information acquired by communication with the camera, or the like, on the rear display LCD 24.

Various switches such as the zoom button 20, mode button 25, charge/test button 26, power button 27, cross-shaped button 28, and menu button 30 are connected to the arithmetic and control circuit 202, and detection of the states of these switches is made possible. A battery 206 formed from a detachable power source battery is a drive power source for the flash unit 100, and performs supply of energy to each of the sections such as the arithmetic and control circuit 202, the motor 104 and the charging/emission circuit 103.

Figure 3B:
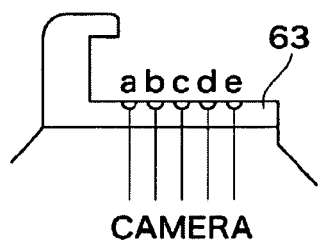

A communication contact 31a is provided at an end part of the hot shoe 31, as described above, and in this embodiment is made up of five terminals a to e. Of these five terminals, terminals a to d are used in communication with the camera 1, while terminal e determines whether or not the flash unit 100 is connected to the hot shoe 63 of the camera 1. As shown in FIG. 3B, the hot shoe 63 of the camera 1 is provided with terminals a to e, and a specified identification signal is output from terminal e. Therefore, by analyzing the identification signal obtained by means of this terminal e-terminal e connection, it is possible to determined whether or not the flash unit 100 is attached to the camera 1.

Figure 3C:
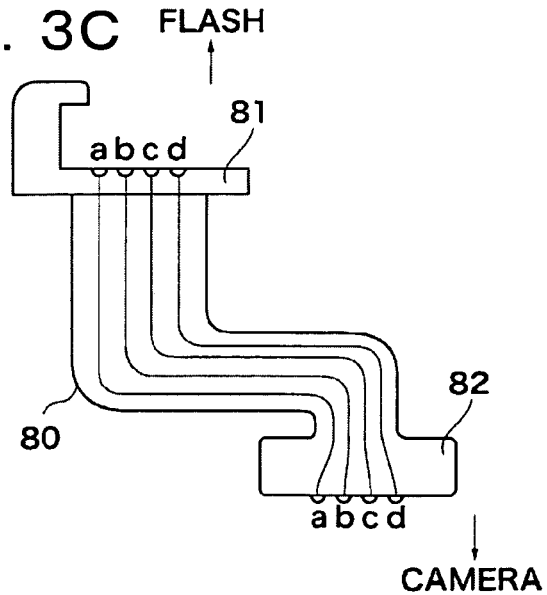

In the case were the flash unit 100 is separated from the camera 1 and used wirelessly, the terminal e of the flash unit 100 does not receive the identification signal, and so it is possible to determine that the flash unit 100 is not attached to the camera 1. Also, in the case where the flash unit 100 and the camera 1 are connected by the off flash cable 80, as shown in FIG. 3C, an electrically open state where there is no line connecting between terminals e to terminal e exists between the cable terminal 81 and the cable terminal 82, and it is possible to determine that the flash unit 100 is not directly attached to the camera 1. This state shown in FIG. 3C represents a case where the flash unit 100 is used physically separated from the camera 1, but while still maintaining wired communication between the flash unit 100 and the camera 1.

Figure 4A:
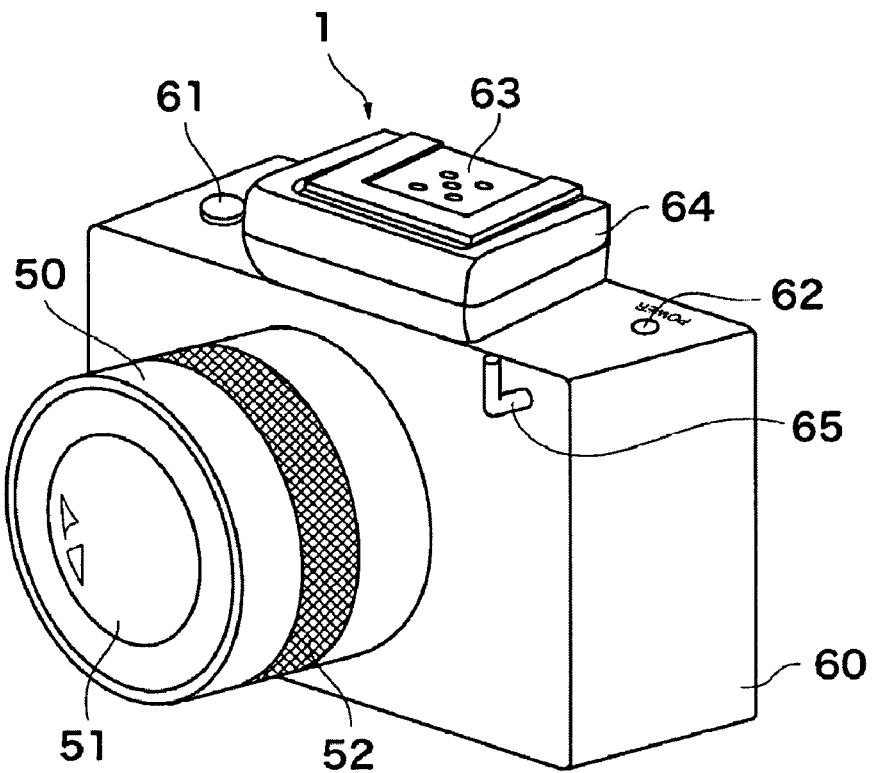
FIG. 4A and FIG. 4B are drawings showing a camera of a first embodiment of the present embodiment, with FIG. 4A being an external perspective drawing of the camera looking from the front, and FIG. 4B being a perspective view of main parts showing a state where a built-in flash 64 has been popped up.
Figure 4B:
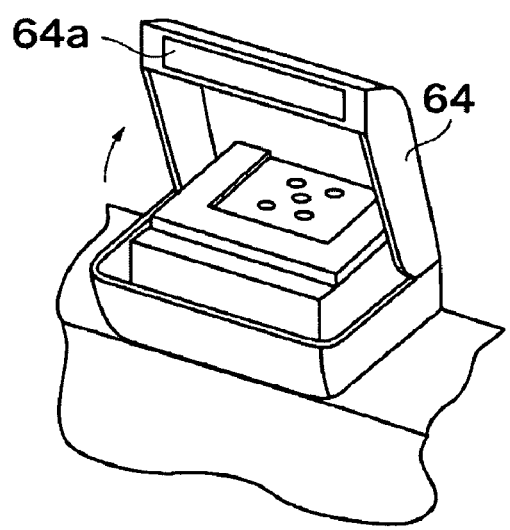
Figure 5:
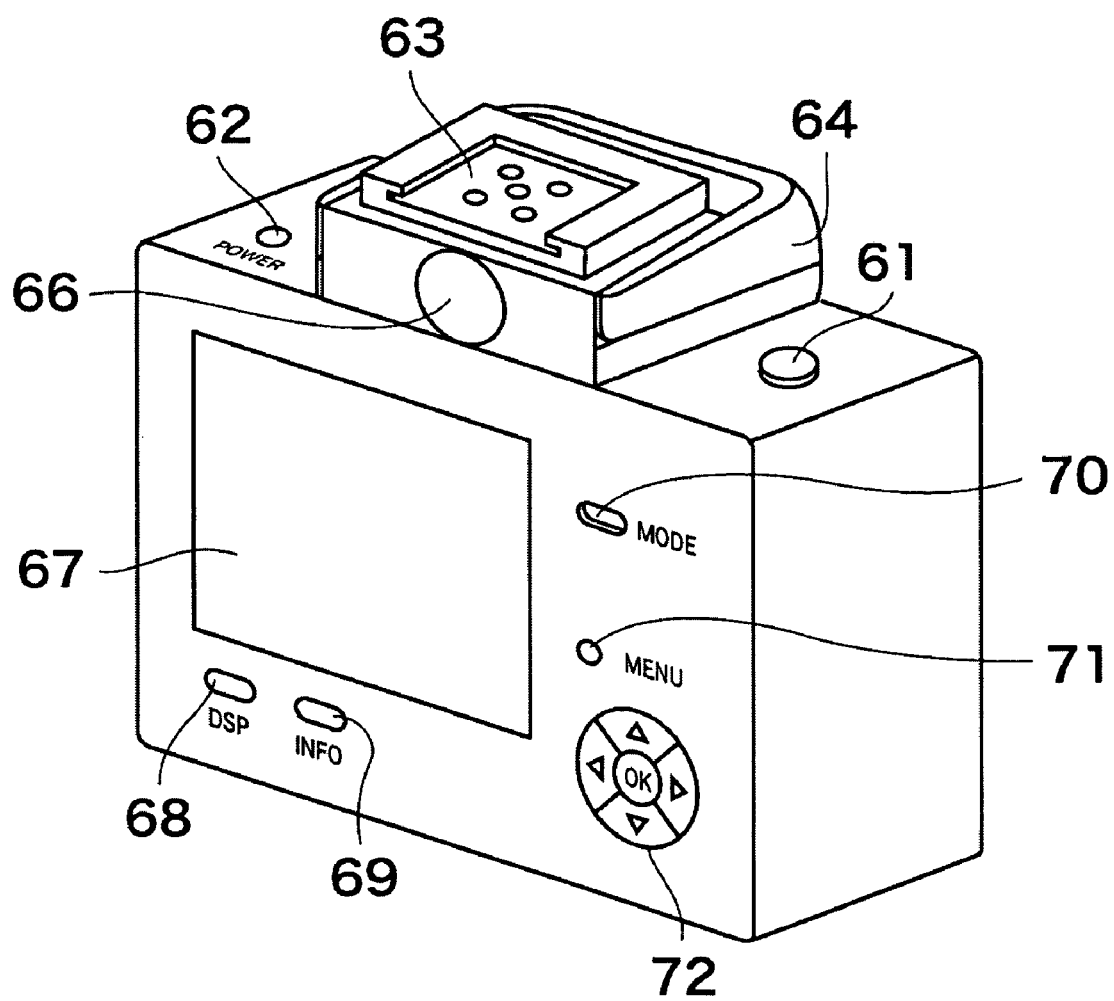
FIG. 5 is an external perspective drawing looking at the camera of a first embodiment of the present invention from the rear.

Next, the camera 1 of this embodiment will be described. FIG. 4A is an external perspective view of the camera 1 of this embodiment looking from the front, while FIG. 4B shows a state where a built-in flash 64 has been popped up. Also, FIG. 5 is an external perspective view of the camera 1 looking from the rear. This camera 1 is a single lens reflex type electronic camera, provided with an image sensor, capable of storing image data based on output from the mage sensor in a storage medium, and at the time of observing a subject, is capable of a so-called live view to display the subject in real time of a rear display LCD 67 that is provided on the rear of the camera, based on the image data.

A photographing lens unit 50 is attached to the front of the camera body 60, substantially in the center. The photographing lens unit 50 can also be integrally fixed to the camera body 60, but in this embodiment it is an interchangeable lens. A photographing lens 51 for forming subject images is arranged within the photographing lens unit 50. This photographing lens 51 can be constructed as a fixed focal length lens, but in this embodiment it is a zoom lens having a variable magnification function. By turning a zoom ring 52 it is possible to carry out a zooming operation, and the variable magnification state (focal length information) is transmitted to the camera body 60 via a contact, not shown.

A release button 61, power button 62, hot shoe 63 and built-in flash 64 are provided on the top of the camera body 60. The release button 61 is an operation member for instructing taking of a photograph, such as a still picture, and the power button 62 is an operation member for starting camera operation in the camera body 60.

The hot shoe 63 is capable of engaging with the hot shoe 31 of the flash unit 100, and is provided with communication terminals a to e (refer to FIG. 3B). The flash unit 100 performs wired communication with the camera 1 via these terminals a to e.

The built-in flash 64 has a light emitting section 64a, and if the built-in flash 64 is popped up the light emitting section 64a can irradiate light towards a subject, while the light emitting section can be housed within the camera body 60 when the built-in flash 64 is not popped up. As well as acting as an illuminating light source at the time of taking a photograph with the camera only, this built-in flash 64 is also capable of performing signal light generation, as a commander flash, when taking pictures with a wireless flash.

A wireless radio communication antenna 65 is provided at an upper right corner on the front of the camera body 60. Wireless communication with the wireless radio communication antenna 29 of the flash unit 100 is performed using this antenna 65.

A viewfinder window 66 is provided at an upper part on the rear of the camera body 60. A subject image formed by the photographing lens 51 can be viewed from the viewfinder window 66, by way of the viewfinder optical system such as a movable reflecting mirror inside the camera body 60, viewfinder screen, pentaprism etc.

Also, a rear LCD 67, DSP button 68, INFO button 69, mode button 70, menu button 71 and cross-shaped button 72 are arranged on the rear of the camera body 60. The rear LCD 67 performs display for playback of images that have been taken by the camera and stored, setting screens for various information, and live view images.

The DSP button 68 in an operation member for switching the live view display on the rear LCD 67 on and off. The INFO button 69 is an operation member for switching display states of information displayed on the rear LCD 67. The mode button 70 is an operating member for switching the operating mode of the camera 1, such as program mode, aperture priority mode, shutter priority mode, manual mode etc.

The cross-shaped button 72, similarly to the cross-shaped button 28 shown in FIG. 2, is made up of direction keys respectively provided for the four directions of up, down, left and right, and an OK button provided in the center of these direction keys. By respectively operating the four direction keys, it is possible to move a cursor displayed on the rear LCD 67, and a selected item is confirmed by operating the OK button.

The menu button 71, similarly to the menu button 30 shown in FIG. 2, is an operating member for menu mode setting, and if the menu button 71 is operated a menu screen is displayed on the rear LCD 67, and by then operating the cross-shaped button 72 in this state it is possible to perform desired setting etc.

Figure 6:
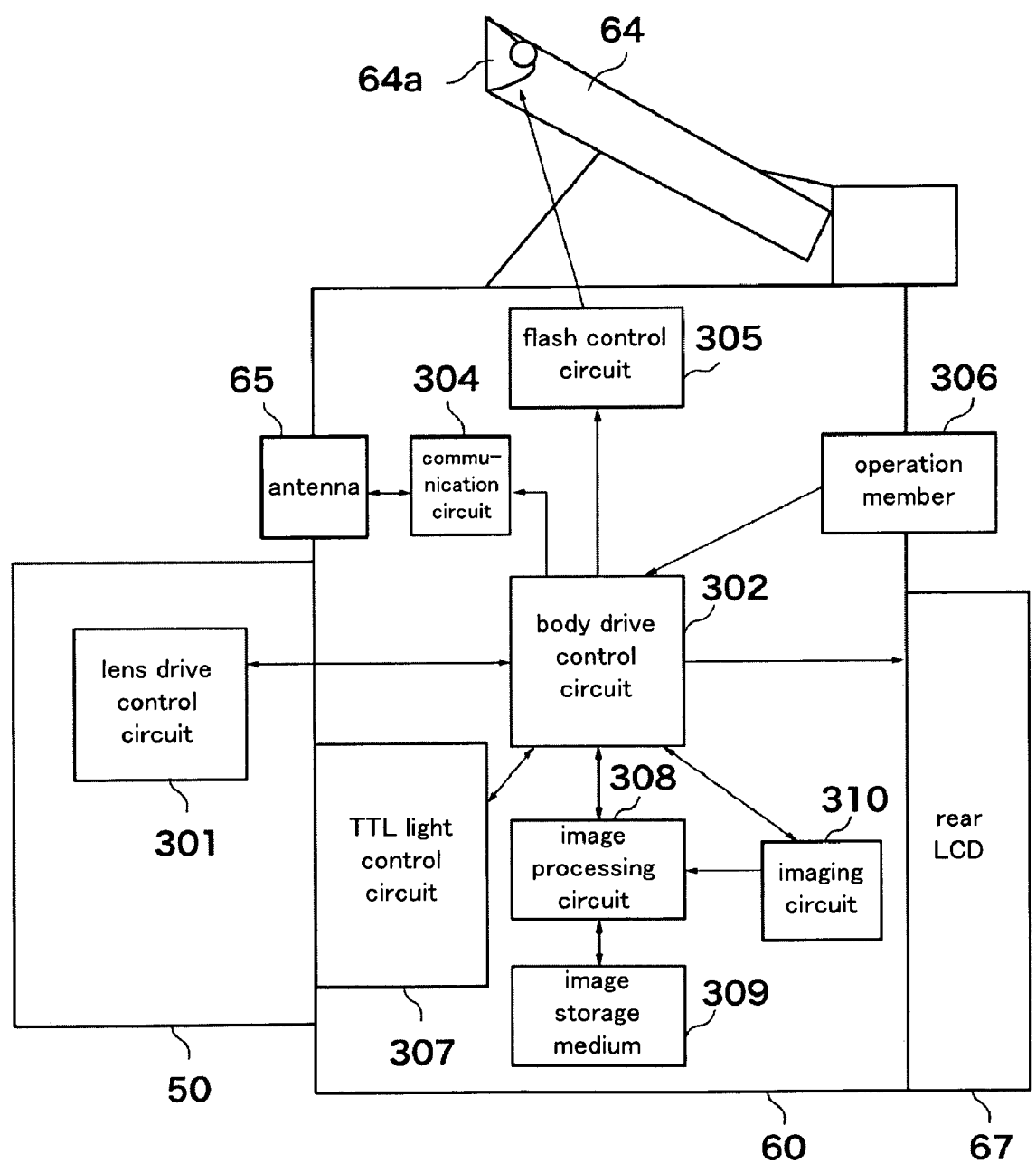
FIG. 6 is a block diagram showing electrical systems of the camera of the first embodiment of the present invention.

Next, electrical systems of the camera of this embodiment will be described using the block diagram shown in FIG. 6. A lens drive control circuit 301 is provided inside the photographing lens unit 50, and perform focus drive and aperture control of the photographing lens 51. A body drive control circuit 302 is provided inside the camera body 60, and performs various controls such as sequence control for the entire camera.

An antenna 65 is connected to a communication circuit 304, and this communication circuit 304 is connected to the body drive control circuit 302. The communication circuit 304 is a communication circuit used in wireless communication, and is controlled by the body drive control circuit 302. The built-in flash 64 is subjected to charge and light emission control by a flash control circuit 305, with the flash control circuit 305 being connected to the body drive control circuit 302 and controlled by it.

In the case where only the built-in flash 64 is used, or the flash unit 100 is independently attached, the flash control circuit 305 carries out illumination control when taking normal photographs. Also, when the flash unit 100A, 100B is removed from the camera body 60, and used in RC mode (wireless remote control mode), the flash control circuit 305 carries out signal light emissions as a commander flash to the flash unit 100A, 100B.

A TTL auto light control circuit 307 is capable of metering brightness of a subject when the flash is not fired, and brightness of a subject when the flash has been fired, in order to control flash amount of the built-in flash 64 or the flash unit 100. Output of the TTL light control circuit 307 is sent to the body drive control circuit 302, where emitted light data, such as flash amount, is generated.

An imaging circuit 310 includes an image sensor arranged close to an image plane of the photographing lens 51, and outputs image data of a subject. An image processing circuit 308 is input with image data from the imaging circuit 310, and carries out image processing such as compression of image data or noise removal. An image storage section 309 is a medium for storing image data that has been processed by the image processing section 308, and is written to by the image processing section 308.

The rear LCD 67 is connected to the body drive control circuit 302, with images stored in the image storage medium 309 being read by the image processing circuit 308 for playback display on the rear LCD 67. The rear LCD 67 can also display live view that has been processed by the image processing circuit 308. Also, in the case where menu mode has been set, the rear LCD 67 performs display of a menu setting screen, or display of various photographic information.

Operating members 306 include operating members such as the release button 61, power button 62, DSP button 68, INFO button 69, menu button 71 and cross-shaped button 72, and operating states of these operating members 306 can be read by the body drive control circuit 302.

Next, image display for an illumination range on the rear display LCD 24 of the flash unit 100 will be described using FIG. 7. As has been described above, the image sensor 107 is provided in the flash unit 100. Using images acquired by the image sensor 107, it is possible to display a range illuminated by the flash unit 100.

With this embodiment the following three display methods are possible, and it is possible to have just one type of display, or to select a method of display in the menu mode. The display style 1 shown in FIGS. 7A and 7B is a method of displaying an irradiation angle of the flash unit 100 using digital zoom.

The arithmetic and control circuit 202 inside the flash unit 100 calculates area of an image equivalent to the irradiation angle from the zoom position of the flash unit 100, performs digital zoom processing on an image acquired by the imaging unit 15 based of the results of calculation, and displays on the rear display LCD 24. The zoom position is calculated based on movement amount of the reflector unit 102 by the motor 104.

FIG. 7A shows the case where the flash unit 100 is set at the wide-angle end, and FIG. 7B shows the case where it is set at the telephoto end. Also, in the drawings, "RC" indicates that RC mode (wireless remote control mode) is set, while "CH1" indicates the wireless communication channel, and in the case of configuring the same system, the same channel is selected. Also, "GrA" is an identification number assigned to each flash unit, and "+0.3" indicates an exposure compensation value. These flash setting values are displayed superimposed on an image of the illumination area within the screen.

Display style 2 shown in FIGS. 7C and 7D is a method of display that does not perform digital zoom, but instead displays within an illumination area bright, and outside the illumination area dark. The arithmetic and control circuit 202 inside the flash unit 100 calculates area of an image equivalent to the illumination angle from the zoom position of the flash, and displays an area of an image acquired by the imaging unit 15 that is outside of the illumination darkly, based of the results of calculation. With this display style 2 also, the setting values for the flash unit 100 are displayed superimposed.

FIG. 7C shows the case where the light emitting section of the flash unit 100 is set at the wide-angle end, and FIG. 7D shows the case where the light emitting section is set at the telephoto end. With this display style 2 it is possible to observe an image for a range that is outside the illumination area, and that could be illuminated by zoom setting. It is therefore easy to understand what the effect will be when zooming from the telephoto end to the wide-angle end. As a modified example of this display style 2, it is possible to display the illuminated area enclosed by a border, without performing digital zoom on the taken image.

The display style 3 shown in FIG. 7E and FIG. 7F is a combination of the previously described display style 1 and display style 2. With this display style 3, the illumination area is divided into a display region 24a that displays an image that has been subjected to digital zoom processing, as with display style 1, and a display region 24b that displays the illumination area brightly, as with display style 2, and the illumination area is displayed using both display styles. The flash setting values are displayed outside the display regions 24a and 24b, and not superimposed on the taken image.

At the wide-angle end, the display region 24a and the display region 24b coincide, and so in FIG. 7E only a single image is displayed. However, there is no problem with displaying the same image in each of the display region 24a and display region 24b, as shown in FIG. 7F, at the wide-angle end also.

Display control for this display style 3 is also carried out by the arithmetic and control circuit 202, by combining processing results for the previously described display style 1 and display style 2. Display with display style 3 means that it is possible to monitor display style 1 and display style 2 at the same time, and it is possible to perform setting more rapidly.

Figure 8:
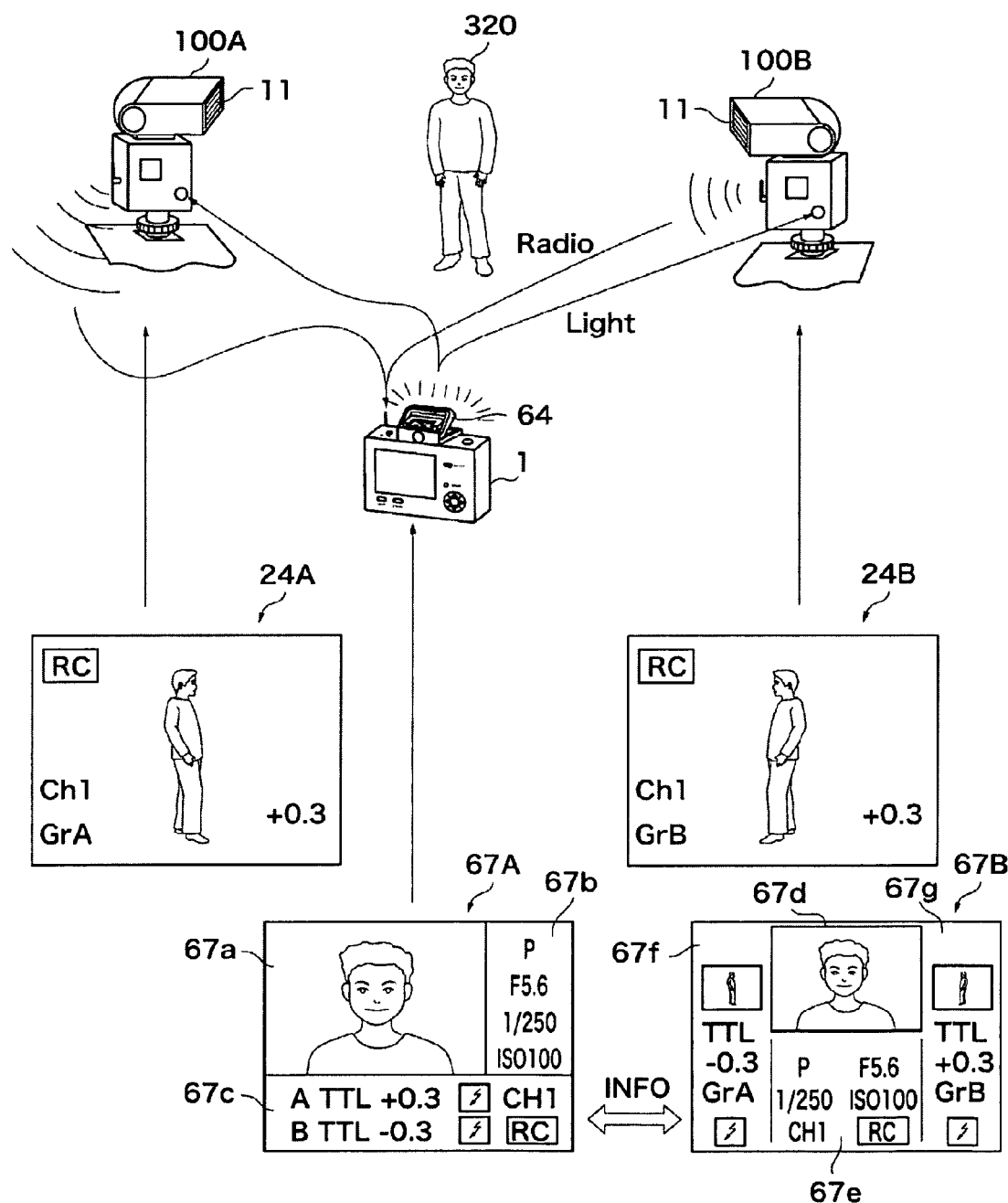
FIG. 8 is a drawing showing arrangement of a camera and flashes of the first embodiment of the present invention, and display on a rear display LCD 24 and a rear display LCD 67.

Next, a system that combines the camera 1 and two flash units 100A and 100B with be described using FIG. 8 for a case where wireless TTL photography is carried out. In the system of this embodiment, the states of the flash units 100A and 100B, and image data of the illumination area, are transmitted to the camera 1 using radio signals, and the camera 1 receives these signals and displays an image of the illumination area. On the other hand, for light emission control of the flash units 100A and 100B, control is carried out using signal light from a commander flash, such as the built-in flash 64 of the camera 1. Specifically, information transmission from the flash units 100A and 100B to the camera 1 is carried out using radio communication, while information from the camera 1 to the flash units 100A and 100B is carried out using optical communication.

The left side flash unit 100A that is facing the subject 320 is set in group A, while the right side flash unit 100B is set in group B. This group setting is carried out on the menus screen of each of the flash units 100A and 100B. If group setting is performed for flash unit 100A, it is displayed on the screen 24A of the rear display LCD 24, and if group setting is performed for the flash unit 100B it is displayed on the screen 24B of the rear display LCD 24.

Also, illumination areas acquired by the imaging units 15 are respectively displayed on the screens 24A and 24B on each flash unit 100A and 100B. With FIG. 8, the display method using display style 1 is shown.

Flash settings of the respective flash units 100A and 100B are displayed on the rear LCD 67 of the camera 1. Specifically, as shown in the screen 67A, flash information 67c is displayed in addition to the live view display 67a and the camera exposure information 67b. Also, by operating the INFO button 69 the display screen state is changed, as in screen 67B, and illumination areas for the flash units 100A and 100B are displayed at the same time.

Specifically, live view display 67d and camera exposure information 67e are displayed at substantially the center of the screen 67B, with illumination area information 67f for the flash unit 100A being displayed on the left side of screen 67B together with flash setting values, and illumination area information 67g for the flash unit 100B being displayed on the right side of screen 67B together with flash setting values. Here, an image of the illumination areas transmitted by wireless communication from the flash units 100A and 100B is displayed in the illumination area information 67f and 67g, and it is possible for the photographer using the camera 1 to confirm the illumination areas at the location where the camera 1 is located, without going to the location where the flash units 100A and 100B are placed.

When the illumination areas of the flash units 100A and 100B are not as the photographer intends, it is possible to adjust the illumination area so as to become appropriate by moving the direction of the light emitting section units 12 up, down, left or right while looking at the image of the illumination areas of the flash units 100A and 100B, or by zooming by operating the zoom button 20.

Also, settings of the flash units 100A and 100B are displayed on the screens 67A and 67B of the rear LCD 67 of the camera 1, and in changing flash settings on the menu screen at the camera side, it is possible to change this setting by operating operation members such as the cross-shaped button 72. The setting values are then transmitted to the flash units 100A and 100B by a commander flash using a specified format, when the release button 61 is pressed down, and the flash units fire in accordance with the transmitted commands.

Next, whether or not to carry out image display of the illumination area of the flash unit 100 on the rear LCD 67 will be described using FIG. 9. As shown in FIG. 9, when the flash unit 100 satisfies three conditions, namely (1) it is attached to the camera 1, (2) it is set to auto-zoom, and (3) the light emitting section 11 of the light emitting unit 12 is facing to the front, the image of the illumination area is not displayed, and only setting values of the flash are displayed. On the other hand, if any one of these three conditions is not met, the image display of the illumination area is carried out together with display of the flash setting values.

This is because in the event that all three of the above conditions are satisfied, the subject 320 being observed through the optical viewfinder of the camera 1 coincides with the illumination area, and so the need to display an image of the illumination area is low, and wasteful consumption of power is prevented by turning off circuits such as the image sensor 107 of the imaging unit 15 and the imaging processing circuit 108. On the other hand, if any one of the three conditions is not satisfied, there is a possibility that the photographing field of view of the camera 1 and the illumination area of the flash unit 100 will be different, and so the image of the illumination area is displayed.

Also, even if the three conditions are satisfied, for example, in a case where the flash unit 100 is switched to manual zoom, or a case where the light emitting unit 12 has been moved, display of the illumination area commences automatically. Also in the case where the flash unit 100 and the camera 1 are connected by the off-flash cable 80, the flash unit 100 detects that the camera 1 is not attached using the signal of the terminal e, and carries out automatic display of the image of the illumination area.

Figure 10:
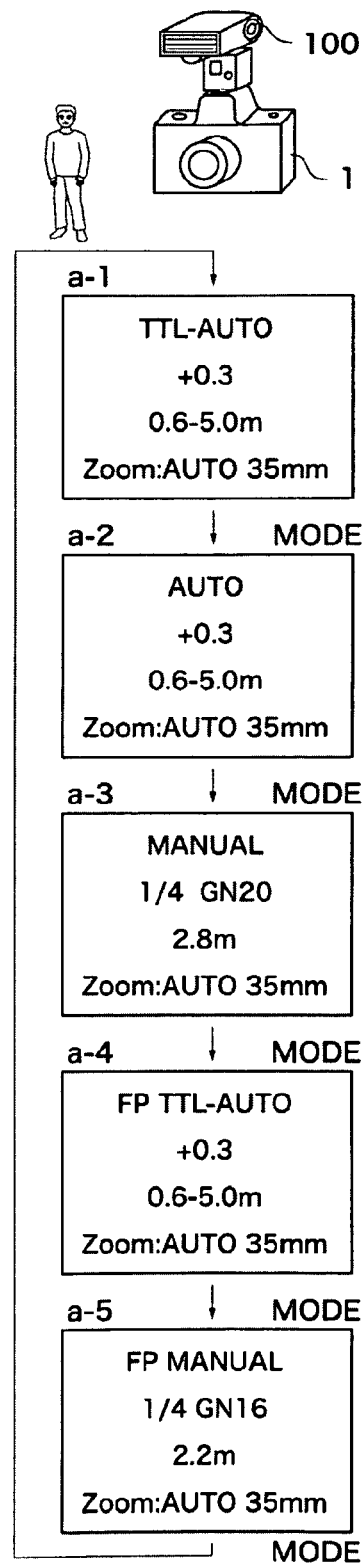
FIG. 10 is a drawing showing light emitting modes of a flash unit, in the case where the flash unit is clipped on to the camera, in the camera flash system of the first embodiment of the present invention.

Next, switching of the flash modes will be described using FIG. 10 and FIG. 11. FIG. 10 shows switching of flash mode, in a camera 1 that is capable of being coupled to the flash unit 100, when the flash unit 100 is attached. In the case where the flash unit 100 is used clipped on like this, there is communication between the camera 1 and the flash unit 100, and it is possible for them to recognize each other.

In this clipped on state, every time the mode button 25 of the flash unit 100 is operated the mode changes sequentially from TTL auto mode (a-1), auto mode (a-2), manual mode (a-3), flat TTL auto mode (a-4) and flat manual mode ((a-5), as shown in FIG. 10. Here, in TTL auto mode, metering is carried out by the TTL light control circuit 307 of the camera 1 at the time the flash unit 100 emits preflashes, and when the flash is not fired, and based on the metering results the body drive control circuit calculates and sets the flash amount for the flash unit 100. Operation of this TTL auto mode will be described later using FIG. 12.

Auto mode (AUTO) is a mode for metering light amount at the time of actual flash using a sensor of the flash unit 100, based on ISO information and aperture information transmitted from the camera 1, and stopping the flash at a time when appropriate exposure is reached. In this embodiment, the image sensor 107 also acts as the sensor for metering at the time of actual flash. This auto mode will be described later using FIG. 13.

Manual mode is a mode for directly setting the flash amount of the flash unit 100. The manual flash amount is set on the menu screen. Flat TTL auto mode (FP TTL-AUTO) is a TTL auto mode that switches to flat flash firing when using a high-speed shutter. Flat flash firing is a flash firing format in which firing of the flash continues at substantially the same intensity in the period of time from the start of travel to completion of travel of the shutter curtain of a focal plane shutter.

Generally, since firing of the flash unit is in an extremely short period of time, it is not possible to use the flash unit with a high shutter speed that is faster than a shutter speed lasting the length of time from when the shutter has becomes completely open after movement of the front curtain has started, until movement of the rear curtain starts. However, by using flat flash firing, it is possible to use the flash unit with high shutter speeds also. Flat manual mode (FP-MANUAL) is a flat flash firing mode for directly setting the flash amount, and it is possible to set the flash amount on the menu screen.

Figure 11:
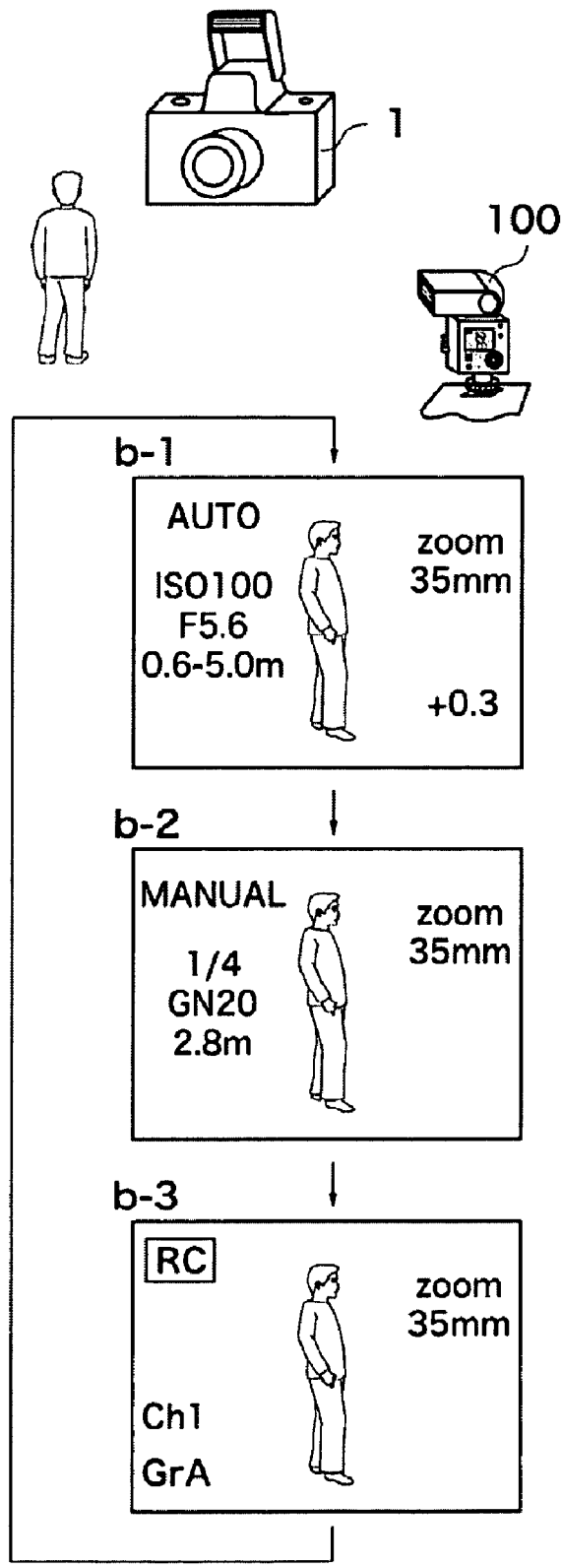
FIG. 11 is a drawing showing light emitting modes of a flash unit, in the case where the flash unit removed from the camera, in the camera flash system of the first embodiment of the present invention.

FIG. 11 shows switching of flash mode, in a camera 1 that is capable of being coupled to the flash unit 100, when the flash unit 100 is not attached, i.e., it is detached from the camera 1. In a state where the flash unit 100 has been detached from the camera 1, communication between the camera 1 and the flash unit 100 via the contact is not established, and so photographing field of view is not transmitted. Also, since the locations at which the flash unit 100 and the camera 1 are located differ, if RC mode is set, then in order to carry out illumination area setting for the flash unit 100, an image corresponding to the irradiation angle of the flash unit 100 is displayed on the rear display LCD 24 of the flash unit 100, as was described using FIG. 8, and setting information for the flash is also displayed overlaid on this image.

Every time the mode button 25 of the flash unit 100 is operated, the mode is sequentially switched in the order auto mode (b-1), manual mode (b-2), RC mode (b-3), as shown in FIG. 11. Here, auto mode (AUTO) is the same as the previously described auto mode. However, ISO and aperture values are not automatically transferred from the camera 1 to the flash unit 100, and so they are set by the photographer. Manual mode (MANUAL) is also the same as the previously described manual mode.

RC mode is set in the case of wireless flash photography, and in this mode wireless flash firing is carried out based on information transmitted using signal light from the commander flash of the camera 1. Operation of this RC mode will be described later using FIG. 14 and FIG. 15.

Figure 12:
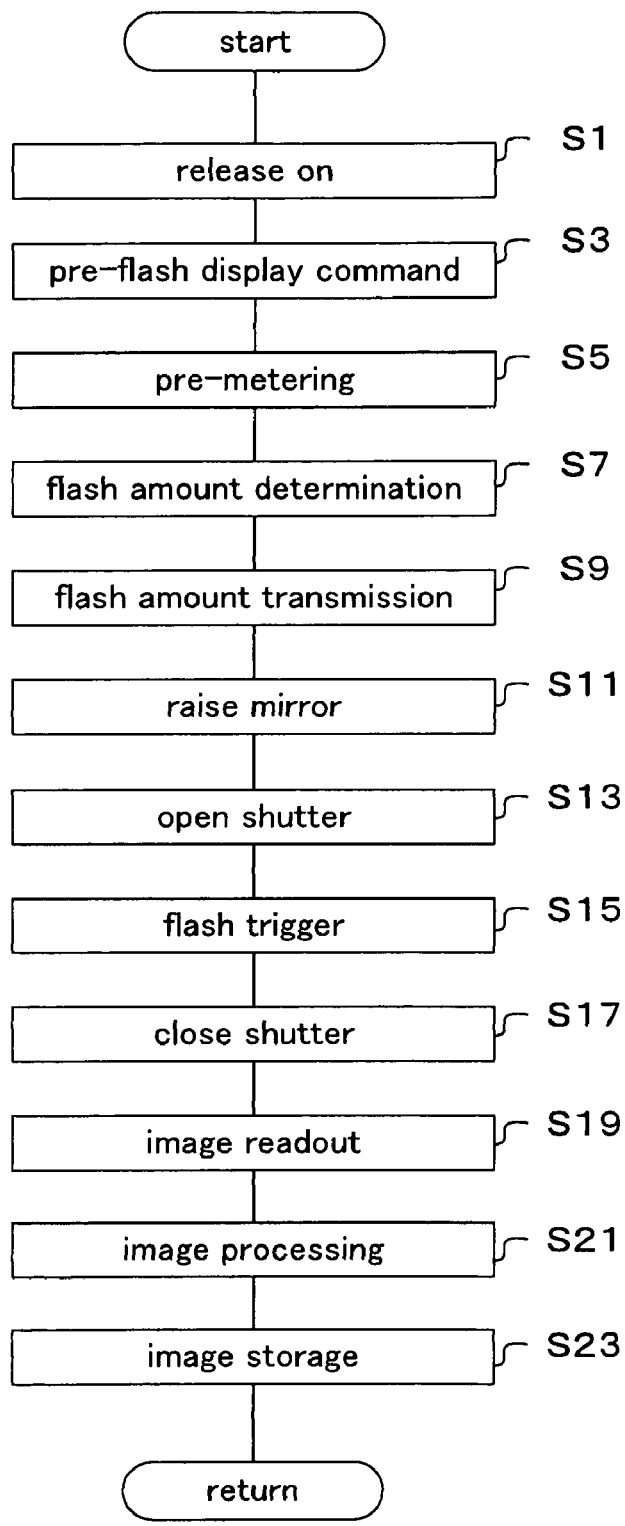
FIG. 12 is a flowchart showing operation of the camera of the first embodiment of the present invention, set to TTL auto mode.

Next, operation of the camera 1 when set to TTL auto mode will be described using the flowchart shown in FIG. 12. If the processing flow for TTL auto is commenced, it is first determined whether or not the release button 61 is on (S1). If the release button 61 is on, a preflash command is transmitted to the flash unit 100 via the communication terminal 31a.

Once the preflash command is received, the flash unit 100 performs preflash firing. Specifically, the arithmetic and control circuit 202 outputs a preflash command to the charge/firing circuit 103, and the Xenon tube 101 fires preflashes.

Next pre-metering is carried out (S5). In this step, reflected light from the subject in synchronism with the preflashes is received (pre-metered) by the TTL light control circuit 307 by way of the photographing lens 51, and the received light amount at this time is transmitted to the body drive control circuit 302. Next, determination of the received light amount is carried out (S7). That is, the body drive control circuit 302 calculates and determines amount of light for the flash unit 100 to obtain correct exposure based on received light amount at the time of pre-metering. Next, this determined light amount is transmitted to the flash unit 100 via the communication terminal 31a (S9).

Since it was possible to determine received light amount of the flash unit 100 based on the amount of light obtained through the photographing lens 51 at the time of preflash, there is a subsequent transition to exposure and actual flash operation. First, a movable reflecting mirror inside the camera body is raised up (S11), and the front curtain of the shutter is moved to open the shutter (S13). By opening the shutter the subject image is formed on the image sensor inside the imaging circuit 310, and charge accumulation of the image sensor commences.

Also, if the shutter reaches the fully open state, a flash trigger signal is transmitted via the communication terminal 31a to the flash unit 100 (S15). In response to this flash trigger signal the charge/flash firing circuit 103 causes the Xenon tube 101 to actually fire. If a predetermined shutter speed has elapsed, the rear curtain of the shutter is made to move to close the shutter (S17).

When the exposure operation is completed, reading of the image signals from the image sensor of the imaging circuit 310 is then carried out (S19), and the image processing circuit 308 performs image processing on the image signals that have been read out (S21). After that, the image processing circuit stores image data that have been acquired through the image processing in the storage medium 309 (S23), and the shooting operation using TTL auto mode is complete.

Figure 13:
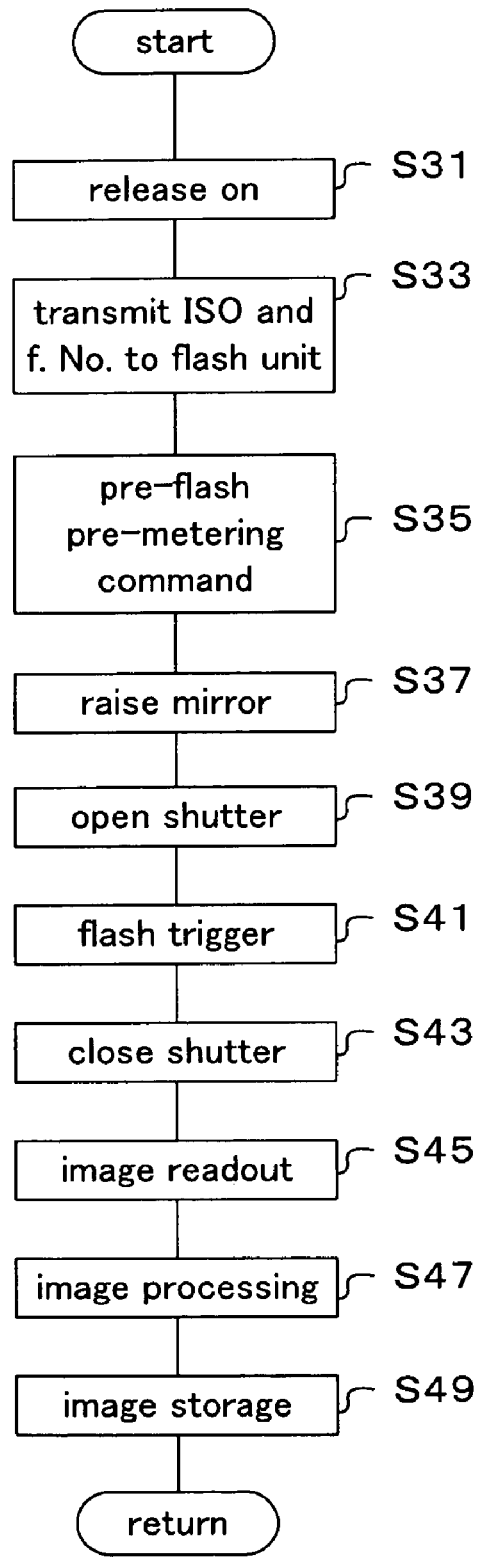
FIG. 13 is a flowchart showing operation of the camera of the first embodiment of the present invention, set to auto mode.

Next, operation of the camera 1 when set to auto mode will be described using the flowchart shown in FIG. 13. If the processing flow for auto mode is commenced, then similarly to step S1 it is first determined whether or not the release button 61 is on (S31). If the release button 61 is on, the set ISO sensitivity and set aperture value (F No.) are transmitted to the flash unit 100 via the communication terminal 31a (S33). Next, commands for preflash and pre-metering are executed in the flash unit 100 (S35).

Once the flash unit 100 has received the preflash and pre-metering commands, the flash unit 100 performs preflash firing, similarly to step 5. Also, at this time reflected light from a subject is received by the image sensor 107 of the imaging unit 15, and based on the received light amount at this time a light amount to achieve correct exposure at the time of actual flash firing is calculated and determined.

After a specified time has elapsed from the preflashes of the flash unit 100, the camera 1, similarly to steps S11, S13 and S15, raises the movable reflecting mirror (S37), opens the shutter (S39), transmits a flash trigger to the flash unit 100 (S41), and performs actual flash firing. After that, similarly to steps S17, S19, S21 and S23, the shutter is closed (S43), image signals are read (S45), the image signals are processed (S47), image data based on the processed image signals is stored (S49), and the shooting operating using auto mode is completed.

Figure 14:
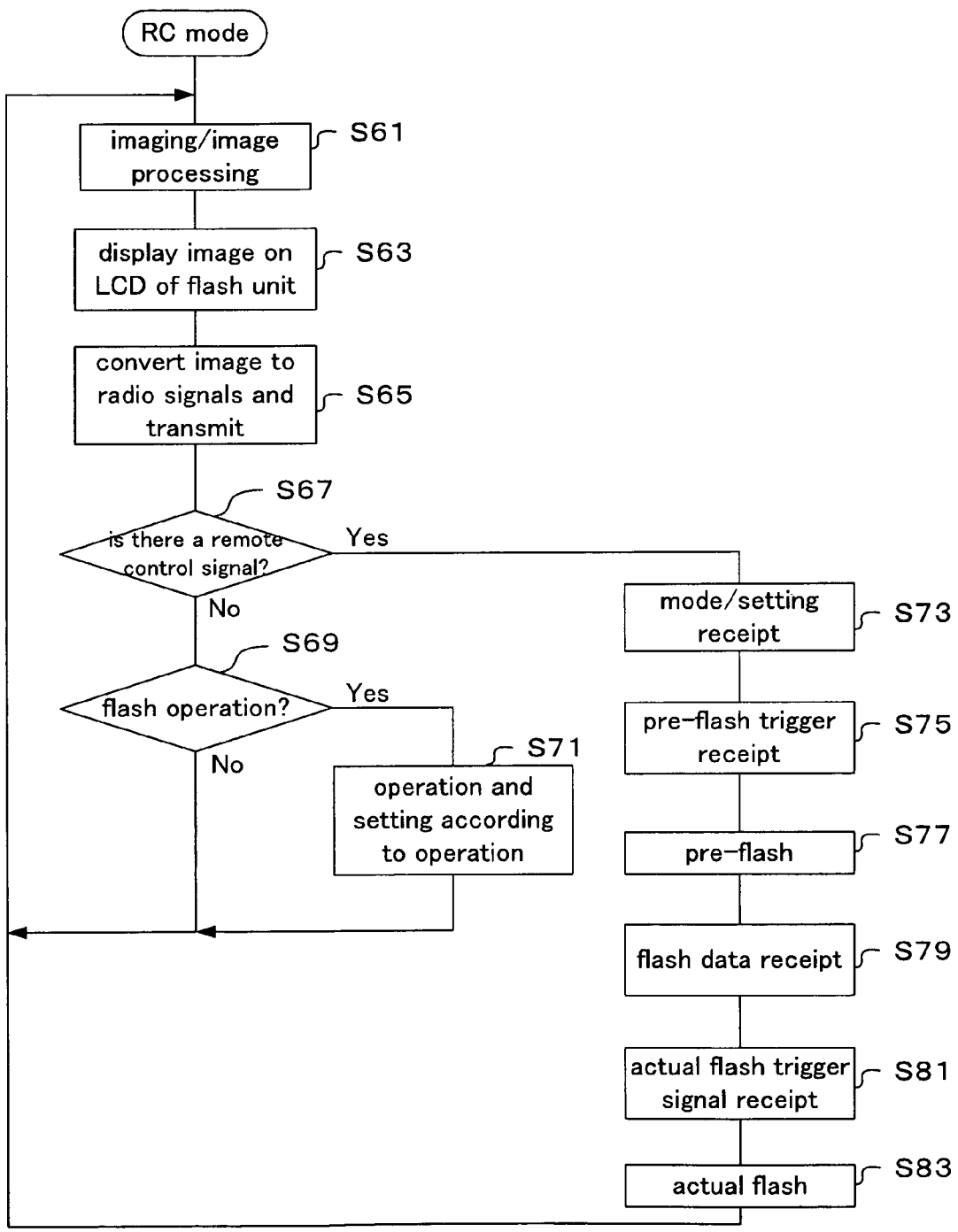
FIG. 14 is a flowchart showing operation of the flash unit of the first embodiment of the present invention, set to RC mode.

Next, operation of the flash unit 100 and the camera 1 in the case where they are set in the RC mode shown by b-3 in FIG. 11 will be described. The flowchart shown in FIG. 14 is for operation of the flash unit 100 when set to RC mode. If RC mode is set by operation of the mode button 25, this processing flow starts. First, image signals acquired by the image sensor 107 of the imaging unit 15 are image processed so as to be able to perform live view display by the image processing section 108 (S61)

The image processed image data is sent to the rear display LCD 24 via the arithmetic and control circuit 202, and live view display is carried out (S63). At this time, the photographer can observe the illumination area of the flash unit 100 by observing the rear display LCD 24. Next, the radio transceiver circuit 201 converts the image data to radio signals and transmits (S65). At this time, in addition an identification code assigned to each flash unit, such as group A, and setting data such as a radio channel used, such as CH1, an exposure compensation value, flash mode of each flash unit etc., is also transmitted. If the camera 1 receives these radio signals, the radiation area is displayed as a moving image on the rear LCD 67, as will be described later.

Next, it is determined whether or not a remote control signal has been received based on output from the slave sensor 23 (S67). As has been described, remote control signals to the flash units 100A and 100B that are detached from the camera 1 are implemented using signal light of a commander flash such as the built in flash 64 of the camera 1 or a flash unit 100 attached to the camera 1. Accordingly, in step S67, determination as to whether or not the remote control signal has been received from the camera 1 is carried out by detecting output of the slave sensor 23.

When the result of determination in step S67 is that the remote control signal has not been received, it is determined whether or not operation buttons of the flash unit 100, such as the zoom button 20, mode button 25, charge/test button 26, power button 27 or cross-shaped button 28 etc. have been operated (S69). If the result of determination is that there has been no operation, processing returns to step S61, and the previously described operations are carried out. On the other hand, if the result of determination is that there has been an operation, operation or setting corresponding to the operated button is carried out (S71) and then step S61 is returned to.

If the result of determination in step S67 is that a remote control signal has been received, a mode or setting corresponding to the remote control signal is received (S73). Specifically, when the camera 1 performs firing control for the remote flash units 100A and 100B, the mode, such as TTL auto mode or auto mode, and setting values required by the mode (for example, in the case of auto mode, ISO sensitivity and aperture value) are transmitted by the commander flash (signal light) before firing, and so in step S73 receipt of this light signal is awaited.

Next, the preflash trigger signal is received (S75). Specifically, before the camera 1 instructs actual flash to the remote flash units 100A and 100B, the commander flash transmits flash data required to carry out the actual flash firing using signal light (flash), and so in step S75 that light signal is received.

In step S75, once a preflash trigger signal is received, preflash is carried out (S77). This preflash is carried out by instructing firing with a specified flash amount to the charge/firing circuit 103. Next, a flash data signal is received (S79). Specifically, before the camera 1 instructs actual flash to the remote flash units 100A and 100B, the commander flash transmits flash data required to carry out the actual flash firing using control light, and so in step S79 that light signal is received. As flash data, in the case of TTL auto mode, for example, there is actual flash amount or the like to achieve correct exposure, that has been obtained as a result of the preflash.

Next, the actual flash trigger signal is received (S81). Specifically, when the camera 1 instructs actual flash to the remote flash units 100A and 100B, the command is transmitted at that time by the commander flash using control light, and so in step S81 receipt of that light signal is awaited.

In step S81, once an actual flash trigger signal is received, actual flash is carried out (S83). This actual flash is carried out by instructing actual flash to the charge/firing circuit 103. The flash amount with actual flash is a flash amount based on flash data received in step S79, in the case of TTL auto mode, or a received light amount based on reflected light from the subject at the time of preflash, and ISO sensitivity and aperture values previously received in step S73, in the case of auto mode.

If actual flash is completed, step S61 is returned to and the previous steps are executed. This processing flow for the RC mode setting is completed once RC mode is released as the mode for the flash units 100, 100A, 100B.

Light communication takes place using signal light between a commander flash, such a flash built-in to the camera 1 or a flash unit attached to the camera 1, and remote flashes such as the flash units 100A, 100B that are detached from the camera 1, but this communication method determines code and data according to a pulsed light interval, and performs recognition of data and control commands by determining this interval time.

Figure 15:
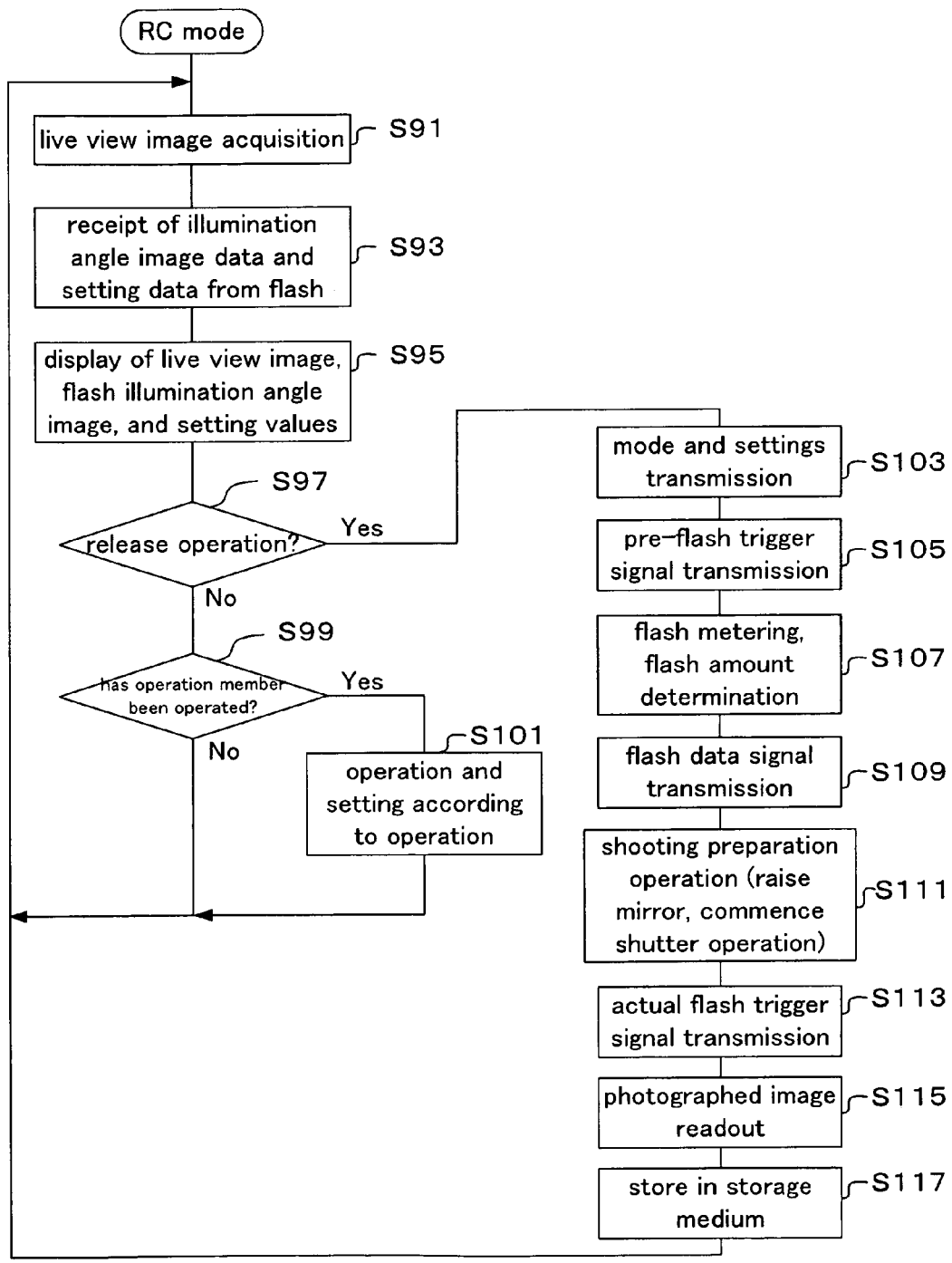
FIG. 15 is a flowchart showing operation of the camera of the first embodiment of the present invention, set to RC mode.

Next, operation of the camera 1 in the case where it is set in the RC mode shown by b-3 in FIG. 11 will be described using the flowchart shown in FIG. 15. If RC mode is set in the menu mode, this processing flow starts. First, acquisition of live view images is carried out (S91). Live view images are acquired by subjecting images that have been acquired by the imaging circuit 310 to processing by the image processing section 308.

Then, image data of the illumination area and setting data are received from the flash unit 100A, 100B. As described previously, in step S65 (FIG. 14) image data of the illumination area is transmitted by radio signals from the flash unit 100A, 100B to the camera 1, and so in this step radio signals are received by the antenna 65.

Next, live view mages acquired in step S91, and the illumination area image and setting data acquired in step S93, are displayed on the rear LCD 67 (S95), as shown in screens 67A and 67B of FIG. 8.

Next, it is determined whether or not a release operation has taken place (S97). In this step, it is detected whether or not the release button 61 has been pressed down fully. If the result of determination is that a release operation has not taken place, it is then determined whether or not an operation member has been operated (S99). In this step, the operation state of operating members such as the power button 62, DSP button 68, INFO button 69, mode button 70 and menu button 71 is detected.

If the result of determination in step S99 is that no operating member has been operated, step S91 is directly returned to. On the other hand, if an operating member has been operated, operation or setting corresponding to that operating member is carried out (S101) and then step S91 is returned to.

If the result of determination in step S97 is that there was a release operation, mode/setting transmission is carried out (S103). As has been described previously, in step S73 (FIG. 14) when the camera 1 performs firing control for the remote flash units 100A and 100B, the mode, such as TTL auto mode or auto mode, and setting values required by the mode (for example, in the case of auto mode, ISO sensitivity and aperture value) are transmitted from the commander flash using signal light before firing.

Next, the preflash trigger signal is transmitted (S105). This transmission is control signals for causing preflash to the remote flash units 100A and 100B, and these signals are transmitted using signal light from a commander flash such as the built in flash 64 of the camera 1 or a flash unit 100 attached to the camera 1.

Next, reflected light from the subject at the time of preflash is metered, and flash amount is determined (S107). Specifically, in TTL auto mode, reflected light amount from the subject at the time of preflash is metered by the TTL light control circuit 307, and flash amount for the flash unit 100 in order to obtain correct exposure is obtained from calculation based on this reflected light amount. In auto mode, metering is performed in the flash units 100A and 100B, and the flash amount determined.

Once flash amount is determined, flash data for the determined flash amount is transmitted (S109). As has been described previously, before the camera 1 instructs actual flash to the remote flash units 100A and 100B, flash data required to carry out the actual flash firing is transmitted from the commander flash using signal light.

If transmission of the flash data has been carried out, an exposure preparation operation is then carried out. As the exposure preparation operation, the movable reflecting mirror is raised, and a shutter open operation is commenced. Next, an actual flash trigger signal is transmitted (S113). As has been described previously, in the case where the camera 1 instructs actual flash to the remote flash units 100A and 100B, it is transmitted from the commander flash using signal light at the time the shutter becomes completely open.

If the actual flash trigger signal has been transmitted and the exposure time has elapsed, a shutter closing operation starts, and a taken image is read out (S115) and stored in the image storage medium 309 (S117), that is, image data of a still image is read from the image sensor of the imaging circuit 310, and after image processing in the image processing section 308 stored in the image storage medium 309. Once storage is finished, step S91 is returned to. Processing flow for the RC mode setting at the camera side is completed once setting of RC mode is released on the menu screen.

Next, metering in auto mode of the flash units 100, 100A, 100B will be described using FIG. 16. The flash unit 100 etc. performs metering at the time preflash is carried out, and determines flash amount for actual flash firing based on output of the image sensor 107 within the imaging unit 15 at that time. The light emission unit 12 of the flash unit 100 etc. has a zoom function for flash illumination, by changing the distance between the Xenon tube 101 and the Fresnel lens 11a. However, the photographing lens 14 for forming an image on the imaging unit 15 is of fixed focal length type, and so image data for only the illumination area corresponding to the zoom value is cropped, and extracted (trimming processing).

Figure 16A:
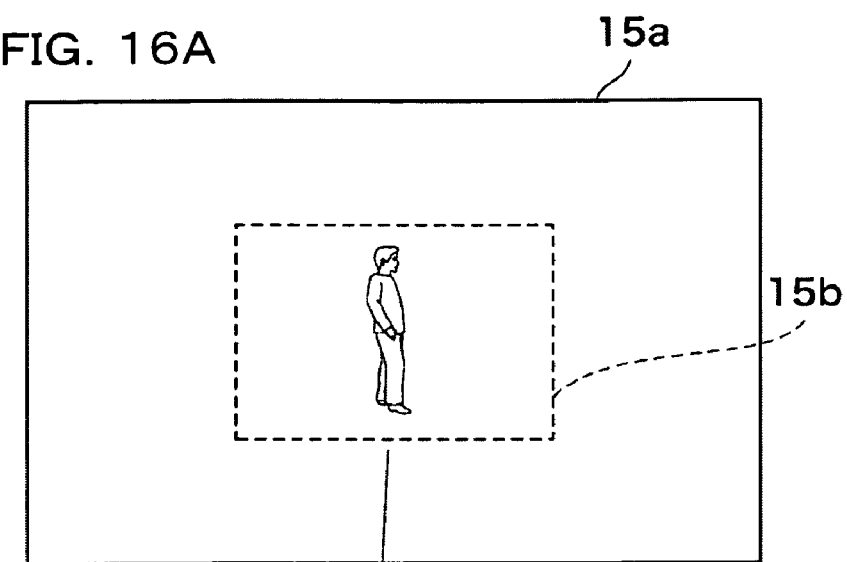
FIG. 16A to FIG. 16C are drawings for explaining the manner of metering in a flash unit of the first embodiment of the present invention set to auto mode, with FIG. 16A being an image acquired in an imaging unit, FIG. 16B being an image generated depending on focal length of the flash unit, and FIG. 16C showing output distribution of imaging elements.
Figure 16B:
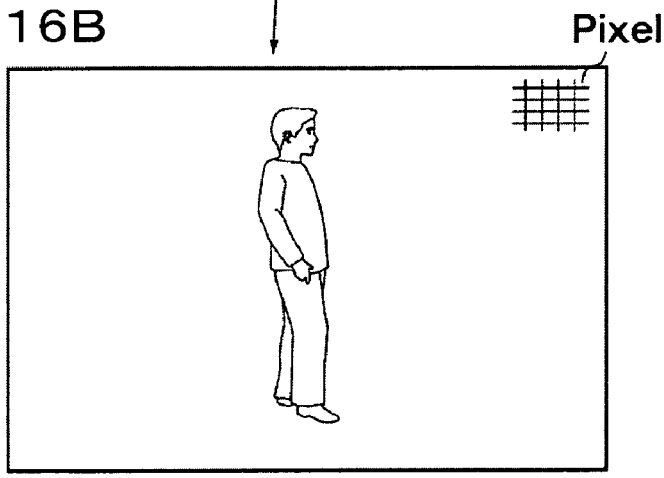

The maximum illumination area for the illumination area of the flash unit 100 etc. corresponds to the overall viewing angle 15a of the imaging unit 15 shown in FIG. 16(a). If the light emission unit 12 of the flash unit 100 etc. performs zooming, only image data of the illumination range 15*b* corresponding to the focal length zoomed to is cropped, for example, as shown in FIG. 16B. This image data is made up of image signals from pixels belonging to that illumination range 15*b*.

Figure 16C:
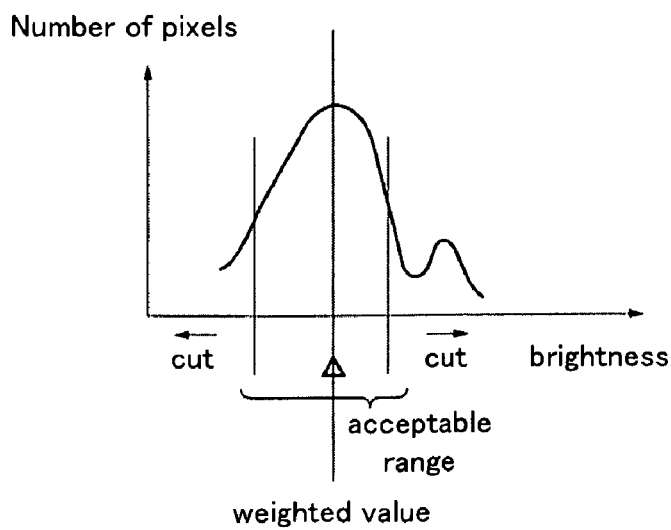

Image data within the illumination range 15*b* then becomes as shown in FIG. 16C. Here, the horizontal axis represents output of pixels of the image sensor, and the horizontal axis represents number of pixels having that output. As photometric value, a weighted average value is obtained of a specified range other than sections likely to be abnormal reflection and sections where reflected light is extremely low, and flash amount for auto mode is calculated based on this photometric value.

As has been described in the above, with this embodiment am image corresponding to an illumination area is displayed using the image sensor 107 provided in the flash unit 100, 100A, 100B. When performing lighting with off-flash photography (taking pictures with the flash unit detached from the camera), it is possible to take pictures rapidly while confirming the illumination area in real time.

Also, with this embodiment, when displaying the illumination area trimming processing is carried out on the output from the image sensor 107 in response to zooming. It is therefore possible to achieve a compact size and low price without provision of an optical zoom in the photographing lens 14 of the flash unit 100 etc. Also, since there is no need to perform optical zooming, it is also made possible to acquire and display an image outside the illumination area.

Further, with this embodiment, since the photographing lens 14 and imaging unit 15 for illumination area image acquisition are provided integrally with the light emitting unit 12, it is possible to have them directly linked to illumination direction of the light emitting unit 12. Also, since the imaging unit 15 etc. is arranged at a lower side of the light emitting section 12, there is reduced detrimental effect due to infiltration of light sources, such as sunlight, on the image sensor 107 causing ghosting or flare etc.

Further, with this embodiment, as shown in FIG. 7A and FIG. 7B, when displaying the illumination area with digital zoom, since the illumination area is enlarged it is possible to confirm the illumination area with enlarged display in cases of partial illumination etc., which is useful is setting the correct flash area.

Also with this embodiment, as shown in FIGS. 7C and 7D, in the case where the flash area is displayed with a border, markings, or areas of differing image brightness, the appearance of the illumination area can also be observed at the same time, it is possible to set the illumination area while monitoring the overall scene, and setting in the case where the illumination area is enlarged by zooming from the telephoto end to the wide-angle end is made easier.

Still further with this embodiment, in the case where the two illumination area display styles described above are combined, as shown in FIGS. 7E and 7F, each illumination area display becomes small, but it is possible to take advantage of the characteristics of the two display styles at the same time.

Further, with this embodiment, in data communication between the flash unit 100A etc. and the camera 1, communication from the camera 1 to the flash unit 100A etc. is carried out using light, and communication from the flash unit 100A etc. to the camera 1 is carried out using radio. Control is therefore made easier without the need for switching of communication direction. Also, communication from the camera 1 to the flash unit 100 etc. uses light, which means that it is possible to reduce release time lag, resulting in excellent synchronization performance between the camera 1 and the flash. Also, since the communication from the flash unit 100A etc. to the camera 1 uses radio waves, it is possible to transmit image data having a greater data amount.

Further, with this embodiment, an image of the illumination area is transmitted from the flash unit 100A etc. to the camera 1, and this image is displayed on the rear display LCD 24. It is therefore possible to confirm the image of the illumination area of the flash on the camera 1, it is possible to confirm the photographing range of the camera 1 and the illumination area of the flash unit 100A etc. on the same screen, and to confirm on the camera 1, which is convenient because there is no need to expressly confirm these parameters by going over to where the flash unit 100A etc. is placed.

Also with this embodiment, as shown in FIG. 9, in a case where coincidence between the illumination area of the flash unit 100A etc. and the photographing range of the camera 1 is achieved, the image of the illumination area is automatically turned off. There is therefore no unnecessary consumption of power by the flash unit 100A. On the other hand, when the illumination area and the photographing range do not coincide, the illumination area is displayed, and there is no danger of taking a picture without being aware of the fact that the illumination area and the photographing range do not coincide.

Also in this embodiment, the image sensor 107 for acquiring the image of the illumination area provided in the flash unit 100A etc. also functions as a light control sensor for external light auto exposure It is therefore possible to reduce size and cost without the need to provide a separate sensor. The image sensor 107 can perform metering by cropping or extracting part of the illumination area, and can carry out further divided detection within this metering range, making it possible to carry out more advanced light control than would be possible with a simple flash.

Next, a second embodiment of the present invention will be described using FIG. 17 to FIG. 25. With the first embodiment of the present invention, the imaging unit 15 was integrally constructed with the light emitting unit 12, and the imaging unit 15 takes images in the direction in which the light emitting unit 12 is facing. Conversely, with the second embodiment, a photographing lens 94 of the imaging unit 95 is made up of a super wide-angle lens, such as a fish eye lens, and is not linked to the orientation of the light emitting unit 12. The flash unit 110 of the second embodiment can also handle bounce photography.

Figure 17:
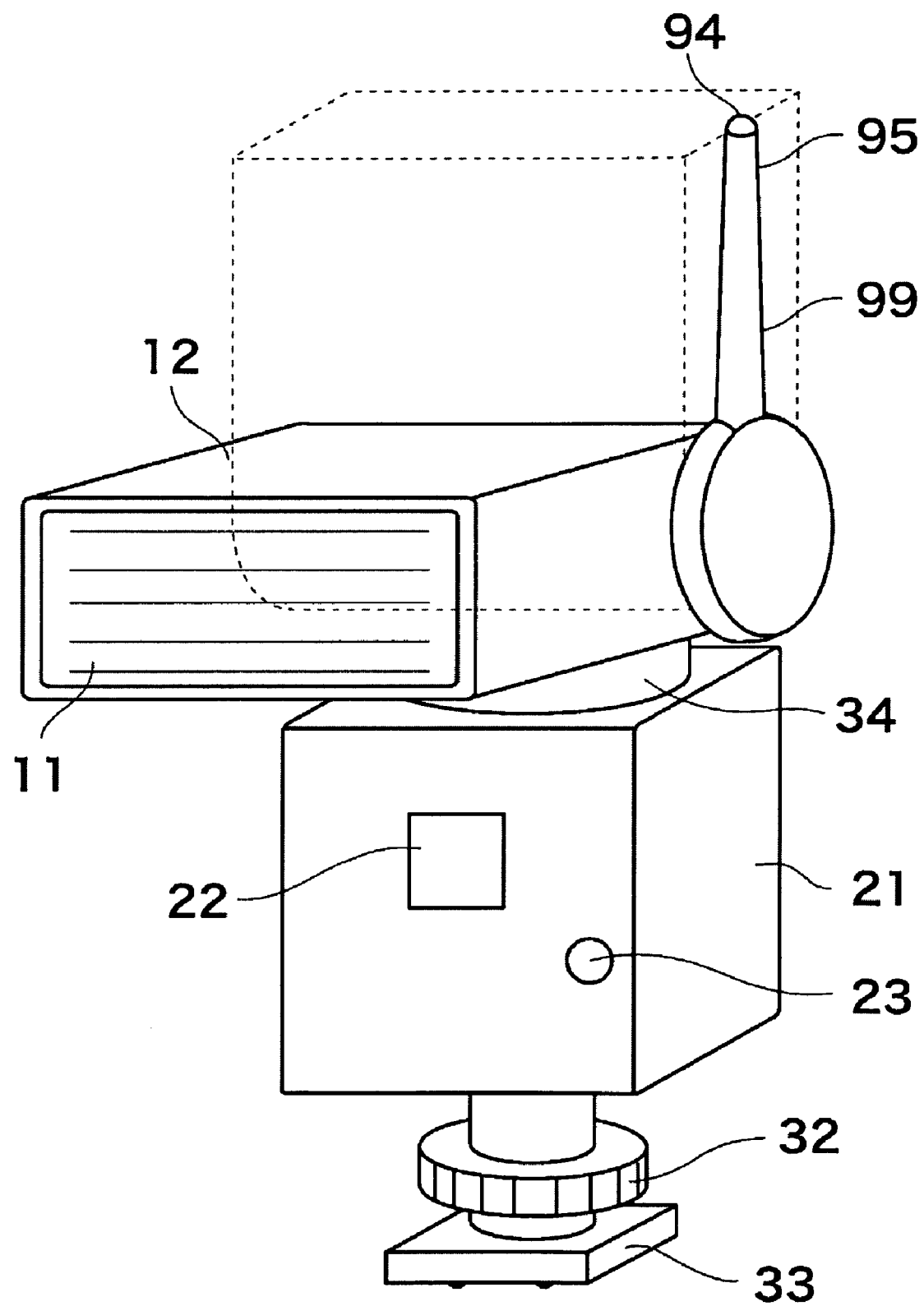
FIG. 17 is an external perspective drawing looking at a flash unit of a second embodiment of the present invention from the front.
Figure 18:
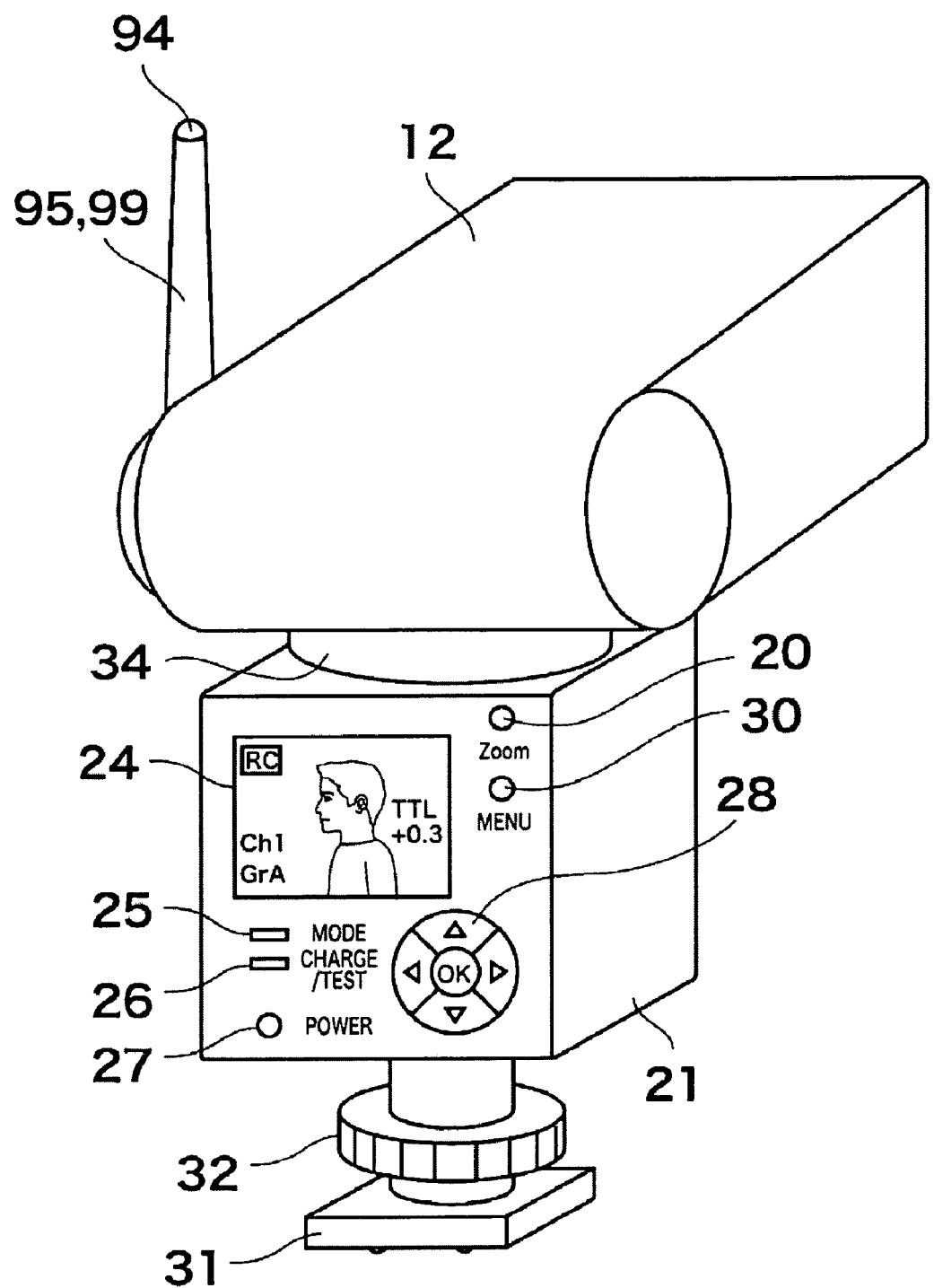
FIG. 18 is an external perspective drawing looking at the flash unit of the second embodiment of the present invention from the rear.

FIG. 17 is an external perspective view of the flash unit 110 of this embodiment looking from the front, while FIG. 18 is an external perspective view looking from behind. Members that are the same as those in the flash unit 100 of the first embodiment have the same reference numerals assigned thereto, and description will center on points of difference.

In the first embodiment, the imaging unit 15 was provided integrally with a lower part of the light emitting section 12, but the imagine unit 95 of the second embodiment is provided separately from the light emitting unit 12, and to the side of the light emitting unit. This imaging unit 95 is constructed integrally with an antenna 99, and this antenna 99 is provided close to substantially the center of the imaging unit 95 that is formed in a rod shape.

Also, the imaging unit 95 faces upwards, and a photographing lens 94 formed as a fish eye lens of super wide angle is arranged at the tip end of its rod shape. The light emitting section 12 is capable of rotation about an axis section 34, the same as the first embodiment, and the imaging section 95 also rotates together with this rotation. However, although the light emitting section 12 rotates about a rotating section to rotate in the vertical direction, the imaging section 95 does not rotate with this up and down rotation.

Accordingly, the photographing lens 94 provided in the tip of the imaging unit 95 remains facing upwards, even if the light emitting unit 12 is rotated, and since it is a super wide angle fish eye lens it is capable of imaging the entire 360 degree field of view. Up and down rotation and left to right rotation of the light emitting section 12 is carried out by electrical drive using a motor, as will be described later.

In the external perspective drawing of FIG. 18 showing the flash unit 110 from behind, the structure is the same as that of the external perspective view showing the flash unit 100 of the first embodiment from behind, apart from the photographing lens 94, imaging unit 95 and antenna 99. In the case of moving the light emitting unit 12, the cross-shaped button 28 provided on the rear surface of the flash unit 110 is operated. When the menu screen is opened or the setting screen is not being displayed, horizontal drive of the light emitting unit 12 is carried out using the left and right keys with the cross shaped button 28, and upward and downward drive of the light emitting unit 12 is carried out using the up and down keys.

Figure 19:
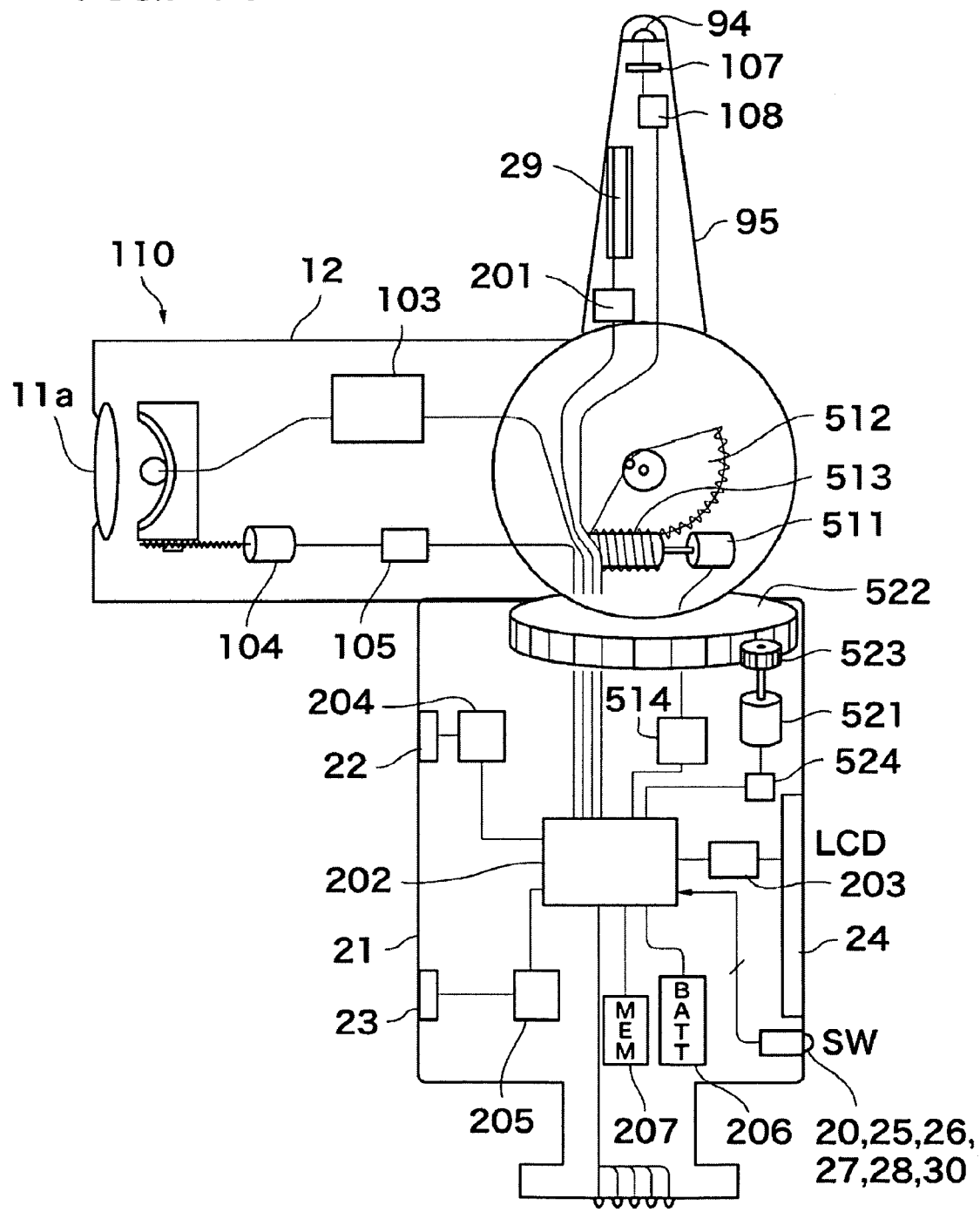
FIG. 19 is a block diagram showing electrical systems of the flash unit of the second embodiment of the present invention.

Next, electrical systems of the flash unit 110 of this embodiment of the present invention will be described using the block diagram shown in FIG. 19. Members that are the same as those in the flash unit 100 of the first embodiment have the same reference numerals assigned thereto, and description will center on points of difference. A significant point of difference from the first embodiment is that the light emitting unit 12 is driven in the up and down directions, and to the left and right, by an electric motor.

The imaging unit 95 is arranged on the axial section 34, and a gear 522 is integrally formed with this axial section 34. A gear 523 provided inside the flash control section body 21 is meshed with this gear 522, and the gear 523 is integrated with a drive shaft of a motor 521. The motor 521 is connected to a motor driver 524, and the motor driver 524 is connected to an arithmetic and control circuit 202, which performs drive control. The motor 521 is formed as a stepping motor, and is provided with a contact for reset position detection, which means that it is possible to calculate a rotation position in the horizontal direction.

The light emitting unit 12 is capable of rotation about a center of rotation of the fan-shaped gear 512, with respect to the imaging unit 95. The gear 513 meshes with this gear 512, and this gear 513 is formed integrally with the drive shaft of the motor 511. The motor 511 is connected to a motor driver 514, and the motor driver 514 is connected to an arithmetic and control circuit 202, which performs drive control. The motor 511 is formed as a stepping motor, and is provided with a contact for reset position detection, which means that it is possible to calculate a rotation position in the vertical direction.

Also, the flash unit 110 of this embodiment is provided with an electrically rewritable non-volatile memory 207 that is connected to the arithmetic and control circuit 202, for storing states of the light emitting section 12 etc. When power to the flash unit 110 is turned off, the light emitting unit 12 is driven to a correctly stowed position, and after storing the state of the flash unit 110 immediately prior to power off in the memory 207, power is shut off. When power is turned on, the state of the flash unit 110 immediately before power off is read out from the memory 207, and drive control of the light emitting unit 12 etc. is performed to restore to that state.

A radio transceiver circuit 201 connected to the arithmetic and control circuit 202 is arranged inside the imaging unit 95, and the antenna 9 is connected to this transceiver circuit 201.

A photographing lens 94, made up of a super wide-angle lens such as a fish eye lens, is arranged in the tip end of the rod shaped section inside the imaging section 95, and an image sensor 107 is arranged close to the image plane of this photographing lens 94.

Next, an image formed in the imaging unit 15 will be described using FIG. 20 and FIG. 21. The imaging unit 94 of this embodiment, as described previously, has a super wide-angle lens such as a fish eye lens, and an image formed by this super wide-angle lens is an image looking around almost 360°, as shown in FIG. 20(*a*), and in that state is distorted.

Figure 20:
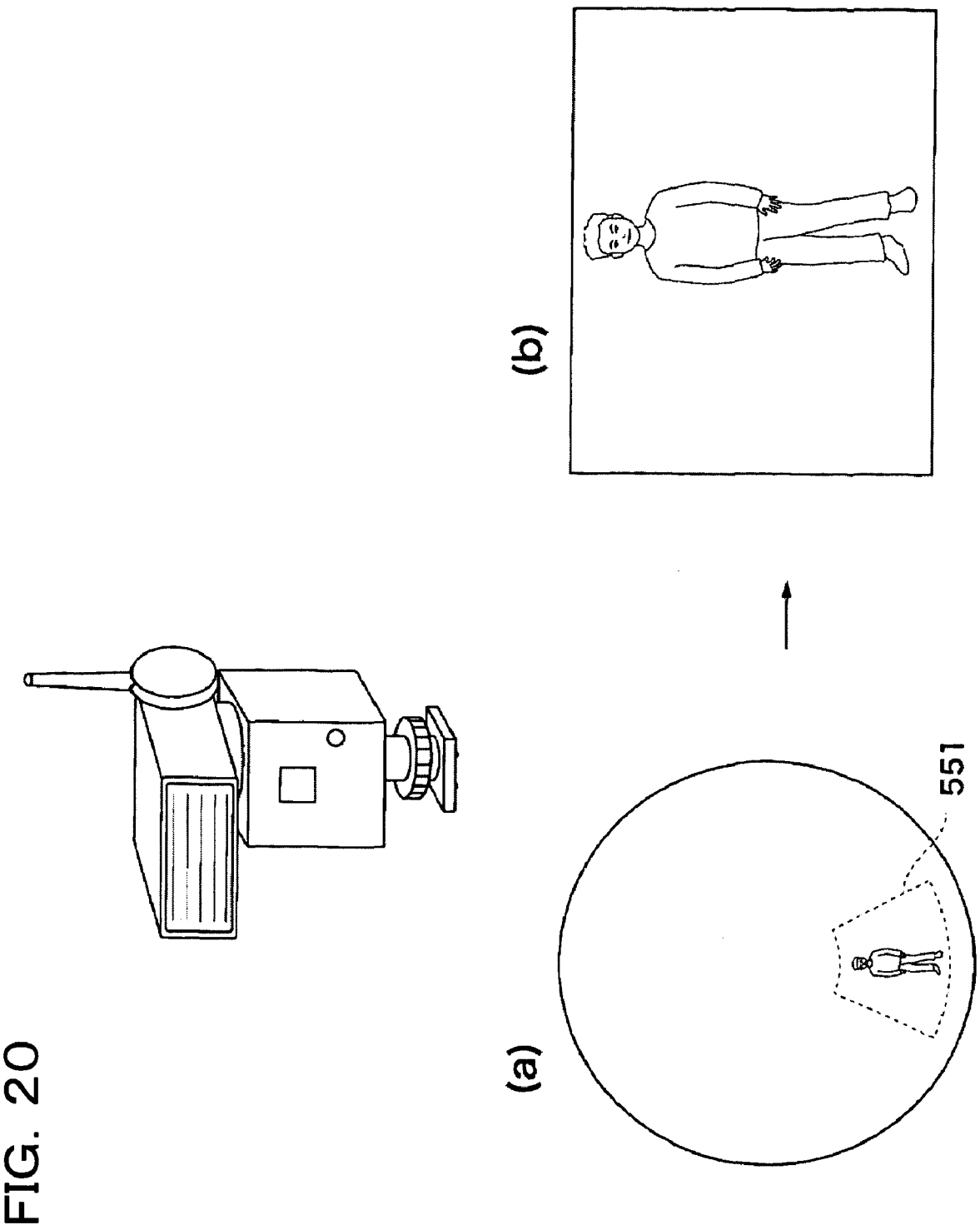
FIG. 20 is a drawing showing an image formed in an imaging unit of the flash unit of the second embodiment of the present invention, with (a) showing a formed image acquired by means of a super-wide-angle lens, such as a fish-eye lens, and (b) shows an image resulting from subjecting the image acquired in (a) to distortion correction.
Figure 21:
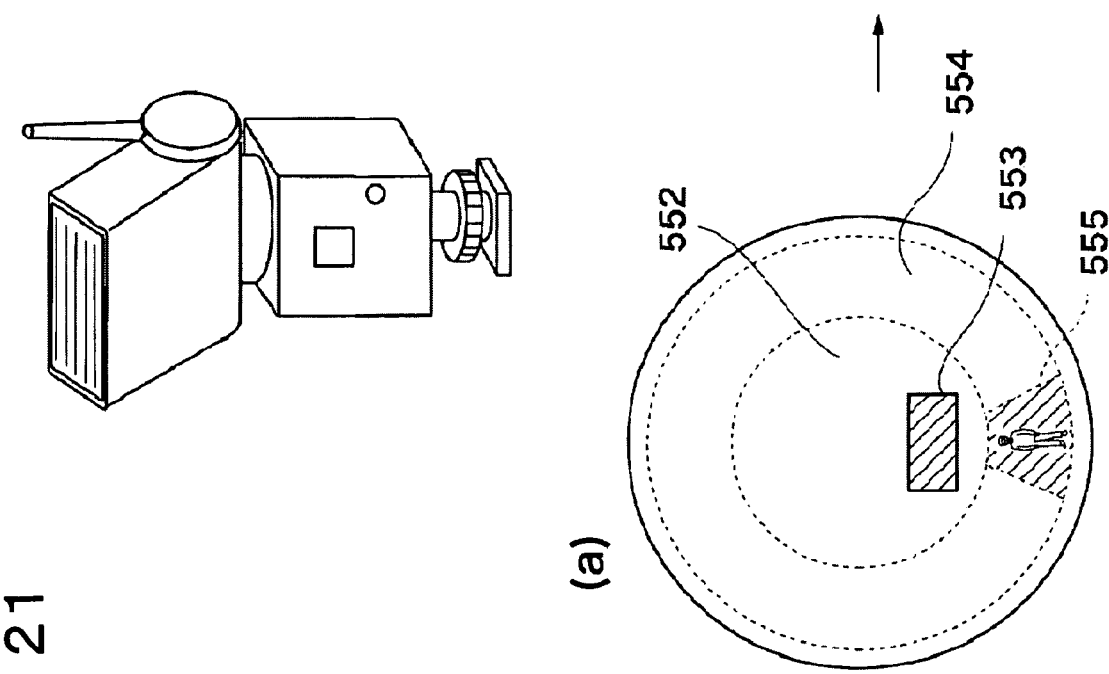
FIG. 21 is a drawing showing an image acquired in an imaging unit, of the flash unit of the second embodiment of the present invention, in the case where bounce photography is performed, with (a) showing a formed image acquired by means of a super-wide-angle lens, such as a fish-eye lens, and (b) showing an image resulting from subjecting the image acquired in (a) to distortion correction.

Therefore, the arithmetic and control unit 202 obtains the direction in which the light emitting unit 12 is facing based on drive amounts from reset positions of the motor 511 and 521, and extracts an illumination range 551 by the light emitting unit 12 using zoom state of the flash unit 110, and acquires an image that has been subjected to distortion correction, as shown in FIG. 20(*b*). The acquired image with no distortion is displayed on the rear display LCD 24.

Also, in this embodiment, in the event that the flash unit 110 uses ceiling bounce or the like, the range of bounced illumination is displayed as the illumination area. For example, when the light emitting unit 12 is pointed upwards at 60 degrees with respect to the horizontal, ceiling bounce is inferred. After this angle setting, the flash unit 110 in the bounce state receives reflected light from the ceiling and subject using the image sensor 107. Of the reflected light at this time, a high reflectance region 553 shown in FIG. 21*a*, which is the ceiling area 552 and where reflected light intensity is strong, represents reflected light of the flash illumination that is from the ceiling. Also, in a level area 554 representing an image region in the horizontal direction, a subject region 555 that received flash illumination and becomes brighter is a region in which the photographic subject exists.

The arithmetic and control circuit 202 analyzes image data from the image sensor 107, crops and extracts image data of the subject region 555 from within the level area 554, and acquires an image for which distortion correction has been carried out. This acquired image with no distortion (refer to FIG. 21(*b*)) is displayed on the rear display LCD 24.

Next, for this embodiment, a system that uses the camera 1 and two flash units 110A and 110B will be described using FIG. 22 for a case where wireless photography is carried out. With this embodiment, the radio transceiver circuit 201 is capable of transmitting and receiving bidirectionally using radio waves, and it is possible to exchange information on respective setting values and image data. Also, information such as that for flash firing after a release operation, that require immediacy, are transmitted by optical communication from the camera 1 to the flash units 110A and 110B, similarly to the first embodiment.

Also, the flash units 110A and 110B are capable of transmitting the image of the illumination area by radio communication, similarly to the first embodiment, and the camera 1 can display an image of the received illumination area on the screen 67C of the rear LCD 67. Also, as described previously, the light emitting sections 12 of the flash units 110A and 110B are capable of being electrically driven by the motors 511 and 521, which means that it is possible to change the angle of these light emitting sections 12 using radio signals from the camera 1.

Also, a distance between the Xenon tube 101 and the Fresnel lens 11*a* can be driven by the motor 104, making it possible to perform zooming of the flash units 110A and 110B. In this manner, it is possible to vary angle and zoom value etc. of the light emitting sections 12 under control of the camera 1, and it is possible to control the illumination area of a wireless flash that is not easily to hand at the camera 1 side, while looking at the image of the illumination range.

Also, similarly to the first embodiment, in order to conserve power the arithmetic and control circuit 202 allows operation of the imaging unit 15 of the flash units 110A and 110B when an operation member of the camera 1 is being operated, but display of the rear display LCD 24 is turned off enabling observation of the image of the illumination area at the camera 1 side.

Figure 22:
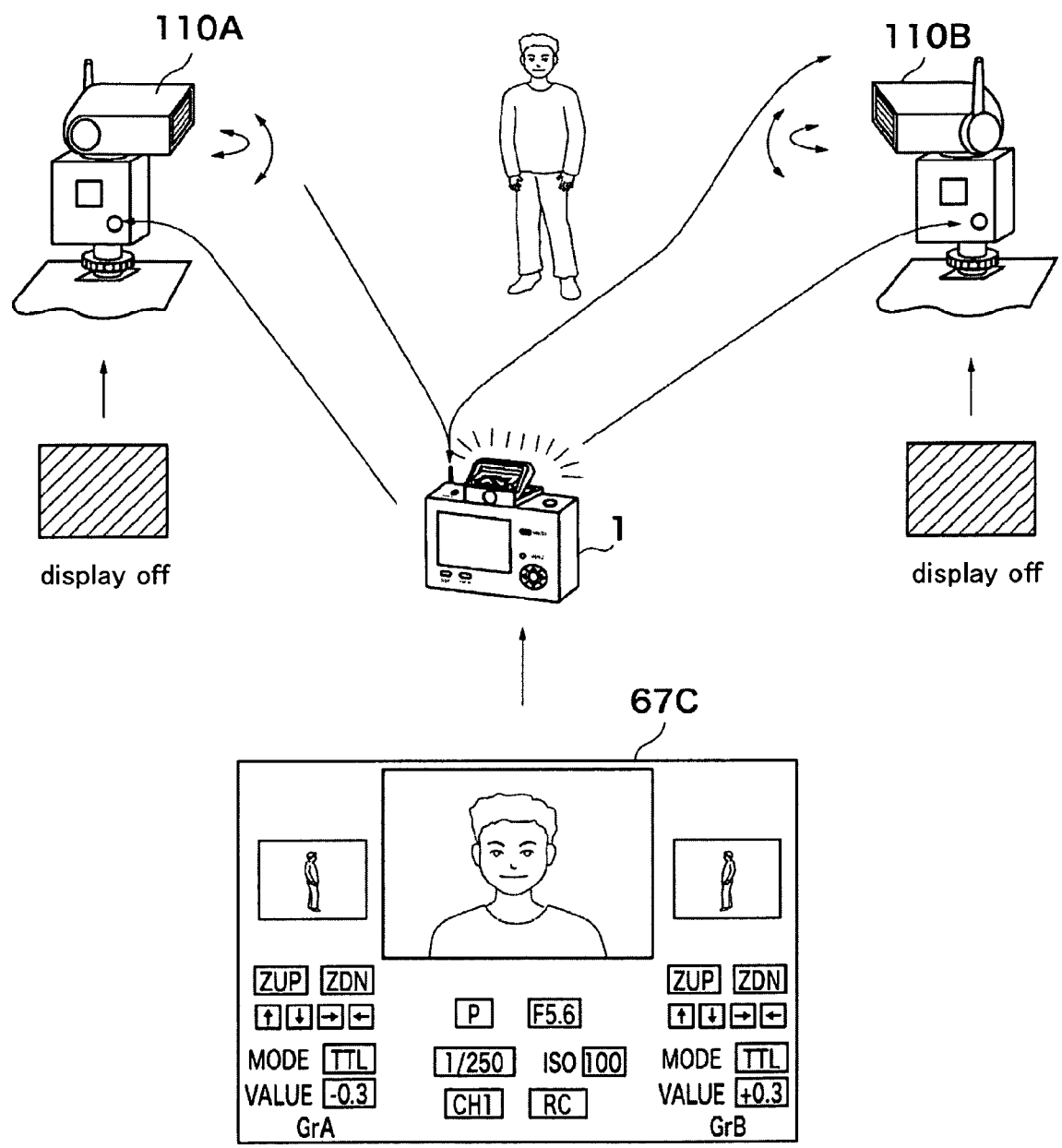
FIG. 22 is a drawing showing arrangement of a camera and flashes of the second embodiment of the present invention, and display on a rear display LCD 24 and a rear display LCD 67, in the case where operation is carried out on the camera.

A live view image showing the photographing range acquired by the camera body, and images showing respective illumination areas of the flash units 110A and 110B, are displayed on the rear LCD 67 of the camera 1, as shown on the screen 67C of FIG. 22. At the same time, setting values for control values of each unit are displayed, and these values can be changed.

For example, in the screen 67C, if the OK button provided in the center of the cross-shaped button 72 that is provided on the rear surface of the camera 1 is pressed, one setting button is lit up, and if items that it is desired to change are selected with the cross-shaped button 72 and the OK button pressed, the setting value is changed each time the button is pressed. Also, arrow buttons within the cross-shaped button 72 are electrical drive buttons for the flash units 110A and 110B, and each time they are selected and the OK button pressed, the angle of the light emitting section 12 is changed. Also, ZUP within the screen 67C narrows the illumination angle by zooming up, while ZDN widens the illumination angle by zooming down.

Next, The flash units 110A and 110B will be described for a case where the flash operation is carried out, using FIG. 23. If the flash unit 110B arranged on the right side facing the subject is operated, it is recognized that the photographer has approached the flash unit 110B, and the arithmetic and control circuit 202 of the flash unit 202 causes the display of the rear display LCD 24 to turn on. At this time, display on the rear LCD 67 of the camera 1 and the rear display LCD 24 of the flash unit 110A are turned off.

Figure 23:
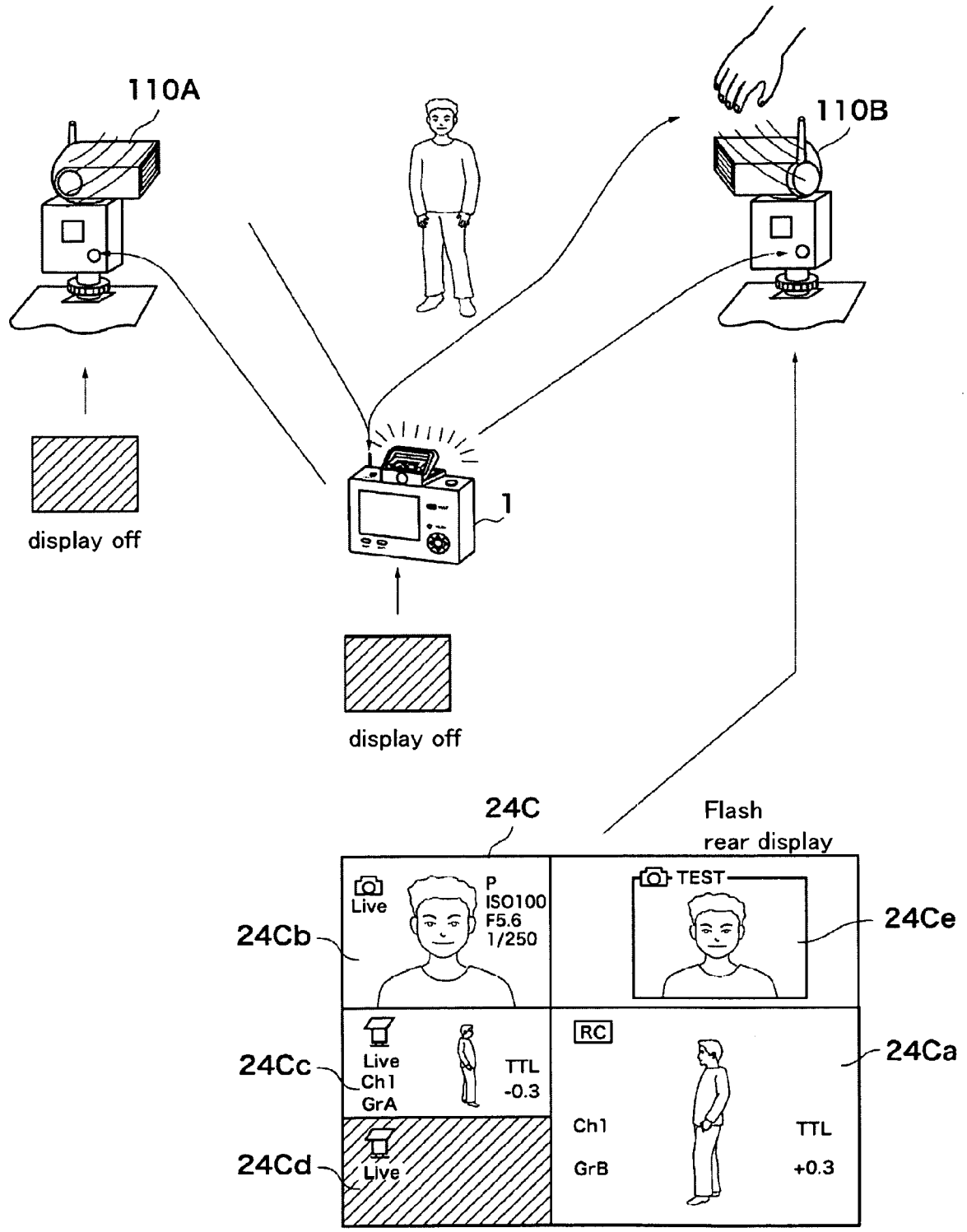
FIG. 23 is a drawing showing arrangement of a camera and flashes of the second embodiment of the present invention, and display on a rear display LCD 24 and a rear display LCD 67, in the case where operation is carried out on a flash unit.

The screen 24C on the rear display LCD 24 of the flash unit 110B at this time is shown in FIG. 23. On the lower right of the screen 24C, illumination area display 24Ca is performed to show the illumination area of the flash. At the upper left of the screen 24C there is live view display 24Cb for the camera 1, and below that basic setting value display for the camera 1. Further below that there is illumination area display 24Cc for the flash (in this case the flash unit 110A) that is set in group A, and in this display the illumination area of the flash unit 110B is transmitted in real time via the camera 1 and displayed.

Further below that, there is a display region 24Cd for flash units set in group C, but in this example there are no flash units operating in that group, and so there is no display. At the upper right of the screen 24C, there is a test flash display 24Ce for displaying flash conditions in the case of the flash unit 110B firing off a test flash.

With this type of structure, if the charge/test button 26 on the flash unit 110A or 110B is pressed, first a flash request is transmitted to the camera 1 using radio signals. Next, the test flash request is received, the camera 1 executes a wireless flash exposure, and image data acquired by the imaging circuit 310 inside the camera 1 at this time is transmitted using radio signals to the flash units 110A or 110B. The flash unit 110A or 110B that has received this image data displays an image for at the time of the test flash on the screen 24Ce of the rear display LCD 24.

With this test flash function, it is possible to confirm an image obtained by the camera 1 at the time of a test flash while changing conditions for the illumination area at the locations of the flash units 110A and 110B, and it is possible to easily adjust the positions of the flash units 110A and 110B, as well as the angle and zoom value of the light emitting units 12, to set optimum lighting.

Next, operation of the flash unit 110 of this embodiment at the time of power off, when not in wired connection to the camera 1, will be described using FIG. 24.

First, if the power off state is switched to, from the power on state, by pressing the power button 27 of the flash unit 110, setting values including vertical direction and horizontal direction of the light emitting unit 12 (head) of the flash unit 110, zoom value of the flash unit 110, mode settings and other settings are stored in the memory 207 (S201). Then, the light emitting unit 12 (head) is set to a horizontal value of forward and a vertical angle of 90° by driving using the motors 511, 521 (S203) The power supply for circuits of the flash unit 110 is then turned off (S205), and the power off operation of the flash unit is completed.

Next, if the flash unit 110 is switched from the power off state to the power on state, first information such as the respective setting values stored in step S201 is read from the memory 207 (S211). Using this read out information, drive control of the motors 105, 511, 512 etc. is carried out (S213) so that the orientation, zoom value, mode setting, etc. of the light emitting unit 12 (head) are put into the state immediately prior to power off, and the power on operation of the flash unit is completed.

Then, if the power is turned on, current flows in all necessary circuits and the display is also turned on (S215). There is no problem in using custom settings, not shown, to prohibit the above described operations of the light emitting unit 12, so that they are not invoked when powering on or off.

Next, operation at the camera 1 side at the time of power off, when the camera 1 is connected to the flash unit 110, will be described using FIG. 25. When the flash unit 110 and the camera 1 are both in the powered on state, if the power button 62 of the camera 1 is operated to power the camera off, setting values including the orientation of the light emitting unit 12 (head) of the flash units 110A, 110B are stored in the memory (S221).

Next, transition to the power off state is instructed to the flash unit 110 (S223). The flash unit 110 receives this instruction and enters the power off state. If power off is instructed to the flash unit 110, the camera 1 next enters the power off state (S225), and the camera power off operation is completed. If the flash unit 110 is kept attached to the camera 1, and at the time of power off the light emitting section 12 etc. is driven to the reset position, then when the camera 1 is powered on again there will be a time lag until the camera is in a state where photography is possible, and so the light emitting unit 12 is not driven to the reset position.

Next, operating the power button 62 of the camera 1 to power it on, in a state where the camera 1 is in wired connection with the flash unit 110, and both the flash unit and the camera move from the power off state, will be described. First, setting information, including previous head orientation of the light emitting unit 12 of the flash unit stored in the memory of the camera 1 is read out from the memory (S231).

Then, the flash unit 110 is activated, it is detected whether the set state of the flash unit 110 is the same as it was previously, and in the event that the result of detection indicates a different state the flash unit 10 is restored to the previous state (S233). For example, after power off, in the event that the light emitting unit 12 is moved by hand or it is replaced with another flash unit, the orientation of the light emitting section 12 is reset to the previous state. If the previous state is returned to, an awaiting exposure state is entered (S235).

It is also possible to provide a function for setting so that operation to restore the state of the flash unit 110 is prevented, using custom settings of the camera 1, although this is not shown in the drawing. It is also possible to store commonly used settings, including those for the light emitting unit of the flash unit, inside the camera 1, and to call these settings up when required and instruct those settings to the flash unit. Further, storage, reading out, and instruction to the flash unit of the flash settings in the camera 1, as well as being done via wired connection, can also use wireless communication, as in the first embodiment.

According to this embodiment described above, since the imaging unit 15 monitors a full 360° over a super wide angle, in cases such as where bounce flash is irradiated using the flash unit 110 it is possible to display an illumination area, even when sections with a different orientation to that of the light emitting unit 12 are illuminated.

Also, according to this embodiment, driving of the head, such as the light emitting section 12 etc., is performed using electric power, and this is useful in cases such as when appropriately stowing the unit at the time of power off, for example, driving to a bounce position that is 90° upwards, and to a horizontal direction that is in line with the front surface of the control section body 21, for stowing the unit in a case. At power off also, since settings immediately before power off are stored, setting of the head, such as the light emitting unit 12, become the previous setting at the time of power on, and it is possible to carry out setting quickly.

Further, according to this embodiment, when the flash unit 110 is attached to the camera 1, then even if power is turned off, differing from the case where it is not attached, the orientation of the head, such as the light emitting unit 12, is stopped as it is, and when recommencing the taking of photographs it is possible to quickly get started.

Also with this embodiment, flash settings, including orientation of the head, such as the light emitting unit 12, are stored in memory inside the camera 1, and at the time of restarting the same conditions are restored to. For this reason, even if the flash unit 110 is replaced due to battery depletion or heating up, and shooting takes place, by powering the camera 1 off once, replacing the flash unit 110 and then turning the power supply on again, it is possible to continue shooting with the same settings for a prolonged period of time.

Further with this embodiment, by storing setting values for the flash unit that are used often inside the camera 1, calling up the setting values by a specified operation, and performing transmission to the flash unit side, it is also possible to easily and rapidly set the often used flash settings.

According to this embodiment, further, not only is it possible to display the illumination area of each flash unit 110A, 110B, and setting values, at the camera 1 side, but also various settings, including up and down, and left and right direction driving of the head, such as the light emitting unit 12, changes to zoom settings of the flash units 110A, 110B, etc. are possible from the camera 1 location. It is therefore possible to quickly carry out settings for wireless flash, without going to the location where the flash units 110A and 110B are located.

Further, according to this embodiment, using the charge/test button 26 it is also possible to display a photographed image at the time of test flash firing with the current settings by going to the location of the flash units 110A, 110B. Therefore, setting changes that cannot be performed by remote control from the position of the camera 1, such as change to the placement location of the flash units 110A, 110B, can be confirmed at the location of the flash units 110A, 110B without having to return to the camera 1.

Also with this embodiment, test shots from the location of the flash units 110A and 110B are controlled by transmitting a request signal from the flash units 110A, 110B to the camera 1, and after that the same control is carried out as for normal shooting from the camera 1 side. It is therefore possible to simplify the circuits and software of the flash units 110A, 110B, reduce size, and reduce cost, without the need to provide a commander function in the flash units.

Also, according to this embodiment, at the time of display, on the rear display LCD 24 of the flash units 110A, 110B, of live view display for the camera 1, display of images of illumination areas of other flash units and display of test shot images, necessary information and images are collected from the camera 1 and transmitted via the camera 1. It is therefore possible to make the processing for the flash units 110A and 110B simple, simplify the circuitry and software of the flash units, and reduce size and cost of the flash units.

Also according to this embodiment, in the case where there is no operation at the flash units 110A and 110B, or the camera 1, display on the rear display LCD 24 or the rear LCD 67 is turned off. It is therefore possible to prevent unnecessary display and prevent wastage of battery power.

The embodiments of the present invention have been described as examples applied to a single lens reflex type of digital camera, but there is no problem with the camera being a so called compact camera or being a camera of the type incorporated into a mobile telephone or PDA (mobile information terminal: Personal Digital Assistant). The present invention is applicable as long as both a camera and a flash unit are used.

Description has been given above of first and second embodiments of the present invention, but the present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. A flash unit, capable of being used as a supplementary light source for photography, comprising:
    a light emitting section capable of varying a flash illumination area; an imaging section capable of forming images, including a subject of the illumination area;
    a display section capable of displaying setting values of the flash unit, or the illumination area; and
    a display control section for causing display of the illumination area on the display section.

2. The flash unit of claim 1, wherein:
    the light emitting section is a movable head capable of varying an illumination direction; and
    the imaging section is formed integrally with the movable head.

3. The flash unit of claim 1, wherein:
    display of the illumination area involves digital enlargement of an image formed by the imaging section according to a zoom state of the light emitting section, and display of the illumination area.

4. The flash unit of claim 1, wherein:
    the imaging section also serves as a light control function for flash amount control at the flash side.

5. A flash unit, capable of being used as a supplementary light source for photography, comprising:
   an imaging section capable of forming an image of a subject of a flash illumination area; a display section capable of displaying setting values of the flash unit, or the illumination area; and
   a detection section for detecting whether a flash unit is fixedly connected to a camera that performs shooting of photographs so that a shot image range and an illumination area are substantially coincident, or whether the flash unit and the camera are separated; and
   a switching section for switching content to be displayed on the display section based on output of the detection section.

6. The flash unit of claim 5, wherein:
   when the flash unit is fixedly connected to the camera, only flash setting information is displayed, without displaying an image showing the illumination area of the flash, and when the camera and the flash unit are separated, an image showing the flash illumination area is displayed.

7. The flash unit of claim 5, wherein:
   the detection section detects the fixed connection or the separation according to a connection state of connection terminals connecting the flash unit and the camera.

8. A flash unit, capable of being used as a supplementary light source for photography, comprising:
   a light emitting section for irradiating flash light towards a subject;
   an imaging section capable of forming images, including a subject of an illumination area of the light emitting section; and
   a transmission section for transmitting photographic images formed by the imaging section to a camera, wherein the transmission section transmits an image including a subject of the illumination area, and information representing a flash illumination range, to the camera.

9. A flash unit, capable of being used as a supplementary light source for photography, comprising:
   a light emitting section for irradiating flash light towards a subject;
   an imaging section capable of forming images, including a subject of an illumination area of the light emitting section;
   a transmission section for transmitting photographic images formed by the imaging section to a camera; and
   a display section for displaying an image of the illumination area.

10. The flash unit of claim 8, further comprising: a receiving section for receiving control signals from the camera.

11. A camera, comprising;
    a camera side transmission section for outputting control signals to a flash unit that is detached from the camera body;
    a camera side receiving section for receiving photographic images of an illumination area from the flash unit; and
    a display section for displaying a photographic image of the illumination area.

12. The camera of claim 11, wherein:
    the camera side receiving section is capable of receiving photographic images of illumination areas from a plurality of flash units; and
    the display section is capable of displaying the plurality of photographic images at the same time.

13. A camera flash system, made up of a camera, and a flash unit that is capable of being detached from the camera and is capable of being used as a supplementary light source for taking photographs, comprising:
    a light emitting section for irradiating flash light towards a subject;
    an imaging section capable of forming images, including a subject of an area illuminated by the light emitting section;
    a flash side transmission section for transmitting photographic images formed by the imaging section to the camera;
    a camera side transmission section for outputting control signals from the camera to the flash unit;
    a camera side receiving section for receiving photographic images of an illumination area from the flash unit; and
    a camera side display section for displaying the illumination area.

14. The camera flash system of claim 13, wherein:
    display of the illumination area on the camera side display section involves simultaneous display of illumination areas for plurality of flash units.

15. The camera flash system of claim 13, wherein:
    the flash unit has a flash side display section for displaying the illumination area; and
    when operation members of the camera are not operated, display of the illumination area using the flash side display section is stopped, and when operation members of the flash unit are operated display of the illumination area on the camera side display section is stopped and the illumination area is displayed using the flash side display section.

16. A flash unit, capable of being used as a supplementary light source for photography, comprising:
    a light emitting section capable of switching an illumination area;
    an imaging section capable of forming an image of a range that is substantially wider than the illumination area; and
    an illumination range image output section for determining a range illuminated by the light emitting section based on an image acquired with pre-flash of the light emitting section, and outputting an image of the illumination range.

17. The flash unit of claim 16, wherein: the flash unit is capable of determining a ceiling range and a horizontal range, and outputs a range having a brightness due to flash firing in the horizontal range that is higher than a specified value, as the illumination range.

* * * * *